United States Patent
Naik et al.

(10) Patent No.: US 9,172,624 B1
(45) Date of Patent: Oct. 27, 2015

(54) DETERMINING PHYSICAL CONNECTIVITY OF DATA CENTER DEVICES

(71) Applicant: Google Inc., Mountain View, CA (US)

(72) Inventors: Ashish V. Naik, Los Altos, CA (US);
Amin Vahdat, Los Altos, CA (US);
Leon Poutievski, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 97 days.

(21) Appl. No.: 13/723,806

(22) Filed: Dec. 21, 2012

Related U.S. Application Data

(60) Provisional application No. 61/580,018, filed on Dec. 23, 2011.

(51) Int. Cl.
*H04L 12/26* (2006.01)

(52) U.S. Cl.
CPC .................................. *H04L 43/0811* (2013.01)

(58) Field of Classification Search
USPC ............... 327/518; 340/10.1, 572.1; 370/218, 370/219, 220, 229, 235, 250, 252, 254, 241, 370/357, 400, 401, 522; 379/25, 442; 709/183, 223, 238, 253; 726/2
See application file for complete search history.

(56) References Cited

U.S. PATENT DOCUMENTS

| | | | |
|---|---|---|---|
| 5,394,503 A | 2/1995 | Dietz, Jr. et al. | |
| 7,193,422 B2 | 3/2007 | Velleca et al. | |
| 7,488,206 B2 | 2/2009 | Caveney et al. | |
| 7,517,243 B2 | 4/2009 | Caveney et al. | |
| 2005/0078009 A1 | 4/2005 | Shalts et al. | |
| 2006/0198634 A1* | 9/2006 | Ofalt et al. | 398/16 |
| 2007/0162954 A1* | 7/2007 | Pela | 726/2 |
| 2008/0253556 A1* | 10/2008 | Cobb et al. | 379/442 |
| 2008/0316940 A1* | 12/2008 | Brooks et al. | 370/254 |
| 2011/0189886 A1 | 8/2011 | Chen | |
| 2011/0313692 A1* | 12/2011 | Diab et al. | 702/59 |

FOREIGN PATENT DOCUMENTS

WO 2005/010641 2/2005

* cited by examiner

*Primary Examiner* — Benjamin H Elliott, IV
*Assistant Examiner* — Eric Nowlin
(74) *Attorney, Agent, or Firm* — Edward A. Gordon; Foley & Lardner LLP

(57) ABSTRACT

A patch panel device has communication ports respectively associated with a unique binary number having a number of binary digits, and a plurality of computing devices are each respectively coupled to at least one of the ports. A connectivity test includes configuring the patch panel device to send a message to a first sending device in response to receiving data at a port associated with a binary number having a first value as the respective binary digit, and not to send a message to a second sending device in response to receiving data at a port associated with a binary number having a second value as the respective binary digit. Each of the computing devices is caused to transmit data for arrival at a corresponding port, an indication is received for each device regarding whether the device received a message. A connectivity map is generated.

20 Claims, 10 Drawing Sheets

//DETERMINING PHYSICAL CONNECTIVITY OF DATA CENTER DEVICES

CROSS-REFERENCE TO RELATED APPLICATIONS

This application claims priority to U.S. Provisional Application No. 61/580,018, filed Dec. 23, 2011. The disclosure of the prior application is considered part of (and is incorporated by reference in) the disclosure of this application.

TECHNICAL FIELD

This document discusses determining and verifying physical connectivity of devices, such as electronic or optical devices in a data center.

BACKGROUND

Public use of the internet continues to grow, with over a billion people now accessing the global network. The bandwidth demanded by each of those users also continues to grow substantially—moving from simple e-mails, to graphical web pages, to full streaming video at very high resolutions. In addition, more data is needed to support traditional computing applications over the internet. As a result, many information providers are building large computing facilities, known as data centers, that can provide various services to internet users.

The internet backbone also needs to grow to support the additional demand from all these new users and new services. Such growth is expensive, however, because backbone routers are huge, complex machines, and running of cross-country fibers is costly. In addition, cross-country communication can introduce latency to communications—both because of increased distances, and because of the increased chance of losing and retransmitting packets that are sent through many routers and through long distances.

Thus, it can be beneficial to distribute computing power closer to users. As such, data centers may be moved closer to users, with relevant content sent from a central facility out to regional data centers only once, and further transmissions occurring over shorter regional links. As a result, every request from a user need not result in a transmission crosscountry and through the internet backbone—network activity may be more evenly balanced and confined to local areas. Also, transient needs for computing power may arise in a particular area. For example, a military presence may be needed in an area, a natural disaster may bring a need for computing or telecommunication presence in an area until the natural infrastructure can be repaired or rebuilt, and certain events may draw thousands of people who may put a load on the local computing infrastructure.

Deploying a data center or a network or cluster within the data center can be an extensive undertaking. For example, some data centers can include thousands of computing devices, such as servers or switches, which typically are physically connected by optical fiber or copper wire interconnects. In some cases, a data center can include several hundred thousand such individual fiber or copper links, which may be manually connected between devices by a technician or team of technicians. Wiring errors or faulty cables can cause deployment delays that span days or weeks as the misconnected or faulty cables are identified and repositioned or replaced.

SUMMARY

This document describes systems and methods that may be employed to quickly determine or verify physical connectivity of computing devices or switches in data center.

In a first general aspect, a method of determining physical connectivity between devices includes, for a patch panel device that includes a predetermined number of communication ports each respectively associated with a unique binary number having a number of binary digits sufficient to represent the predetermined number of communication ports, and a plurality of computing devices each respectively coupled to at least one of the patch panel communication ports via a physical communication link, performing a connectivity test that includes a number of testing rounds equal to the number of binary digits sufficient to represent the predetermined number of communication ports, each of the testing rounds associated with a respective binary digit of the number of binary digits. The connectivity test includes configuring the patch panel device to send a message to a first sending device in response to receiving data at a patch panel communication port associated with a binary number having a first value as the respective binary digit, the received data packet having been sent by the first sending device. The connectivity test also includes configuring the patch panel device to not send a message to a second sending device in response to receiving data at a patch panel communication port associated with a binary number having a second value, different from the first value, as the respective binary digit, the received data having been sent by the second sending device. The connectivity test further includes causing each device of the plurality of computing devices to transmit data over the corresponding physical communication link for arrival at a corresponding communication port of the patch panel device, and receiving an indication, for each device of the plurality of computing devices, of whether or not the respective device received a message following the transmission of the data. The method of determining physical connectivity between devices also includes generating a connectivity map according to the received indications.

In various implementations, the plurality of computing devices may include at least one server and at least one switch. The message that is transmitted to the first sending device may include the data received on the corresponding patch panel communication port from the first sending device. The physical communication link may include a fiber optic cable, or a copper wire. Generating the connectivity map may include, for each device of the plurality of computing devices, determining the patch panel communication port to which the corresponding device is physically coupled by generating a binary number that matches the unique binary number associated with the respective patch panel communication port. Generating the binary number may include providing a binary digit of the first value if a message is received at the computing device within a predetermined time from the transmission of the data. Generating the binary number may include providing a binary digit of the second value if a message is not received at the computing device within a predetermined time from the transmission of the data. The first value may be "1" and the second value may be "0", or the first value may be "0" and the second value may be "1". The message may be received by the respective device of the plurality of computing devices. The computing devices of the plurality of computing devices that include more than one communication port may transmit data from each of their more than one communication ports. An indication of whether or not a message is received following the transmission of the data may be recorded for each of the more than one communication ports.

In a second general aspect, a computer-readable storage device storing instructions that, when executed by one or more processing devices, perform operations that include, for a patch panel device that includes a predetermined number of communication ports each respectively associated with a unique binary number having a number of binary digits sufficient to represent the predetermined number of communication ports, and a plurality of computing devices each respectively coupled to at least one of the patch panel communication ports via a physical communication link, performing a connectivity test that includes a number of testing rounds equal to the number of binary digits sufficient to represent the predetermined number of communication ports, each of the testing rounds associated with a respective binary digit of the number of binary digits. The connectivity test includes configuring the patch panel device to establish, for each known communication port, a communication path between send a message to a first sending device in response to receiving data at a patch panel communication port associated with a binary number having a first value as the respective binary digit, the received data packet having been sent by the first sending device. The connectivity test also includes configuring the patch panel device to not send a message to a second sending device in response to receiving data at a patch panel communication port associated with a binary number having a second value, different from the first value, as the respective binary digit, the received data having been sent by the second sending device. The connectivity test further includes causing each device of the plurality of computing devices to transmit data over the corresponding physical communication link for arrival at a corresponding communication port of the patch panel device, and receiving an indication, for each device of the plurality of computing devices, of whether or not the respective device received a message following the transmission of the data. The performed operations also include generating a connectivity map according to the received indications.

In a third general aspect, a method of determining physical connectivity between devices includes, for a patch panel device that includes a predetermined number of patch panel communication ports, and a plurality of computing devices each respectively coupled to at least one of the patch panel communication ports via a physical communication link, performing a connectivity test. The connectivity test includes configuring the patch panel device to establish, for patch panel communication ports known to be coupled to particular computing devices, a communication channel between the respective patch panel communication port and a patch panel communication port not known to be coupled to any of the plurality of computing devices, wherein a first number of the patch panel communication ports are initially known to be coupled to particular computing devices of the plurality of computing devices. The connectivity test also includes causing the particular computing devices to transmit data over the corresponding physical communication link, and receiving an indication of computing devices that received a message following the transmission of the data. The method of determining physical connectivity between devices also includes generating a connectivity map according to the received indication.

In various implementations, the connectivity test may be performed iteratively until all patch panel communication ports of the predetermined number of patch panel communication ports are known to be coupled to particular computing device of the plurality of computing devices. Generating the connectivity map may include, for each device of the plurality of computing devices that received a message following the transmission of the data, determining the patch panel communication port to which the corresponding device is physically coupled based on the received message and the communication channels established by the patch panel device.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Disclosed herein are methods and systems for determining physical connectivity between devices, such as between computing or switching devices in a computing environment. Such methods and systems may provide convenient and rapid verification that devices are wired as expected, such as according to a connectivity blueprint or map, and may permit any discrepancies with respect to the blueprint or map to be quickly identified and corrected. The methods and systems may also be used to discover or generate a connectivity blueprint or map based on determined physical connections between devices or determined device identities associated with physical connections. Before turning to a description of the methods for determining or verifying physical connectivity between devices, it will be helpful to consider a computing environment and examples of devices and systems that may be used with the aforementioned methods.

Figure 1:
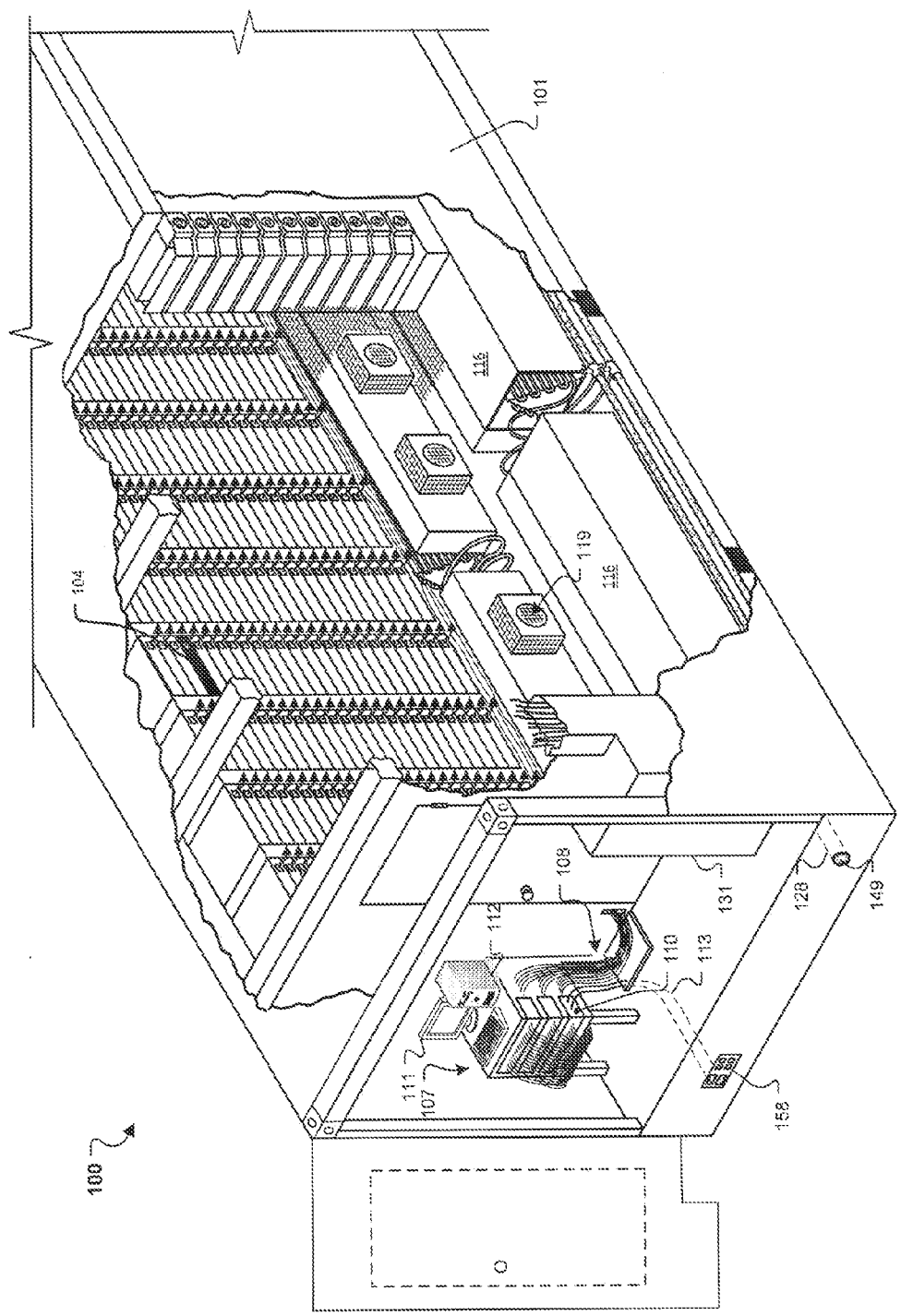
FIG. 1 is a perspective diagram of an example computing environment.

FIG. 1 is a perspective diagram of an example computing environment 100 that represents a portion of a data center. The example computing environment 100 may include a large number of processing devices for executing computer program instructions and processing or routing data, and a large data storage capacity for storing and retrieving data. In operation, the example computing environment 100 may be connected to a network, and may receive and respond to various requests from the network to retrieve data, process data or store data. In some implementations, a data center may include several such computing environments. For example, more than one example computing environment 100 may be combined to form a massively parallel data center, and the massively parallel data center may be replicated at various physical locations. As used in this description, "massively parallel" refers to a distributed computer system having many individual nodes, each of which may be essentially an individual computer having, in some implementations, a processor, memory, and a storage device. The many individual nodes of the computer system may be linked together by a network to allow nodes to communicate with each other and to communicate with networks and devices external to the computer system. In some implementations, each node of the massively parallel system may be employed to execute a small part of a larger program, task or operation.

As one example of a data center or other massively parallel computer system, an online information provider that supplies content and services (such as a search engine functionality) to many users substantially simultaneously may employ a number of data centers at different physical locations to store the supplied content and data needed to provide the search engine service or to satisfy data access latency requirements or design parameters. Deploying multiple data centers that are relatively close to large numbers of users can be particularly advantageous for delivering time-sensitive content or applications.

An online information provider may be required to handle a very large volume of simultaneous data traffic. For example, the information provider's computing system may receive numerous requests at approximately the same time from computer terminals of users attempting to employ the information provider to locate sources of information corresponding to particular topics. In order to simultaneously receive and process a large number of requests from users for search engine services, the information provider may need a massively parallel computing environment having a large number of processors to execute code, a large storage capacity, and a high-bandwidth network interface.

FIG. 1 illustrates an example computing environment 100 that may be used to add computing power to a massively parallel computing system, such as, for example, a data center. As shown, the example computing environment 100 includes various computing resources, an integrated cooling system, an integrated power distribution system, and an integrated networking interface. The example computing environment 100 of FIG. 1 is depicted as a modular computing environment, protected by an enclosure 101. In some implementations, the example computing environment 100 is easily transported, protected from environmental elements and thus suitable for use either inside or outside a building, configured to be easily and quickly connected with other computing environments to form larger computing systems, and easily serviced by human operators. In some implementations, the example computing environment 100 may be a part of a fixed installation, and may not include enclosure 101, or may include only a portion of enclosure 101.

The computing resources of the example computing environment 100 include a large number of processor boards. As used in this description, "processor board" refers generally to a board that includes computing or switching resources. In various implementations, some or all processor boards may include one or more microprocessors for executing computer program instructions, dynamic memory for use while executing the computer program instructions, storage devices for storing persistent data, and an interface to link the processor board with other processor boards and with one or more networks. In some implementations, a processor board may include only storage devices and corresponding controller(s) and may omit general-purpose microprocessors or general-purpose dynamic memory. In some implementations, a processor board may include switching circuitry capable of creating or receiving a data packet and routing the data packet to another computing device.

The processor boards may be physically disposed in racks, and racks carrying processor boards may substantially line the example computing environment 100 along the length of one or both sides of the enclosure. For example, in some implementations, the example computing environment 100 may include well over 1,000 processor boards. As shown in FIG. 1, a shaded region 104 represents a single processor board. The processor board 104 may be designed to be easily removed from the corresponding rack in order to be serviced. For example, the board 104 may be configured to slide along rails to facilitate easy servicing or replacement of the board 104.

In various implementations, processor board 104 may represent a switch, such as an optical circuit switch, that can digitally route data between computing devices (e.g., between other processor boards) or can itself generate data packets for transmission. Switches may act as aggregation points in some implementations. In various implementations, the processor board 104 may represent a server device, and may be able to host applications, for example. Whether the processor board 104 represents a switch or a server, or another type of computing device, it may include one or more (e.g., one, two, three, four, or more) interface ports to which wires or cables may be connected to provide connectivity. In this manner, the processor board 104 may be physically connected via the wire or cable to other devices in the example computing environment 100 or elsewhere in the data center. In some implementations, each server may include one port, and each switch may include several ports. In some implementations, one or more servers may include more than one port, and one or more switches may include one, two, three, four, or more ports. In some implementations, the switches may be physically larger than the processor boards 104 depicted in FIG. 1, and may reside elsewhere in the computing environment 100 or elsewhere in the data center, but for simplicity it will be understood herein that the depicted processor boards 104 may include servers or switches, or any computing device capable of data packet generation, for example.

Each processor board 104 may be coupled to a network internal to the example computing environment, and each processor board may further be accessible from a network external to the enclosure. In some implementations, the network internal to the example computing environment 100 includes a patch panel device 107. The patch panel device 107 may provide access connections (e.g., an RJ-45 Ethernet jack or optical interface) to network interfaces on each processor board, and the access connections may be coupled to the processor board network interfaces by, for example, category 5 or category 6 cable or fiber optic cable. For simplicity, a single patch panel device 107 is shown in FIG. 1, but in some implementations a computing environment or data center can include more than one patch panel device. Throughout a data center, for example, there may be dozens or even hundreds of patch panels.

The access connections on the patch panel device 107 may be referred to as patch panel ports, and the network interfaces of the processor boards may also include ports, so that patch panel ports may be physically connected to processor board ports as described above (e.g., by a category 5 or category 6 cable, or fiber optic cable). In particular, a patch panel port may be physically connected by wire or cable to a port of a processor board 104, such as a server or switch. For clarity, the ports are not shown in FIG. 1, but representative wires or cables 108, which connect the patch panel device 107 to various processor boards 104, are depicted. The ports of the patch panel may be individually numbered, and in various implementations may number about one hundred, several hundred, about one thousand, or more than one thousand. In some implementations, many or all of the patch panel ports may be physically connected via wire or cable to a server or switch (either of which may be represented by the generic processor boards 104 depicted in FIG. 1) in the computing environment 100.

The network may further include a router 110 to digitally route data from a high-bandwidth data connection external to the enclosure to processor boards within the enclosure. A high-bandwidth connection 113 may couple the patch panel 107 to one or more network interface connections 158 configured to connect to a network external to the computing environment 100. The high-bandwidth connection 113 may include one or more high-speed copper interfaces or one or more optical interfaces. For example, the high-bandwidth connection may include a gigabit Ethernet access point for balanced twisted-pair copper wire and an optical interface for connection to single- or multi-mode optical fiber. In particular, the high-bandwidth network connection may include a 10-gigabit Ethernet interface for coupling single-mode optical fiber carrying SONET (synchronous optical network signals) at carrier level 192 (OC-192) to an optical router 110.

The patch panel device 107 may be programmable in some implementations. For example, the patch panel device 107 may be configured or programmed to establish a connection through the patch panel between any two devices (e.g., host server or switch) connected to the patch panel device at the patch panel ports. Alternatively, the patch panel device 107 may be programmed to cause any packet received at a patch panel port to be directed back to the sending device via the same port, a connection that may be referred to as a loopback connection. In some implementations, a monitor/control terminal 111 may be provided to allow a human operator to monitor the various connections on the patch panel 107, switches or router 110, or to monitor actual data traffic. In some implementations, the monitor/control terminal 111 may enable a human operator to program the patch panel to dynamically switch interconnections between various processor boards 104 within the computing environment 100, or connections between an external network and various processor boards. In some implementations the patch panel device 107 may receive configuration information from another computing device 112, such as a desktop computer or server, laptop computer, tablet computing device, or a smartphone used by a technician in configuring, verifying, or analyzing connectivity within the data center, for example.

During operation, the computing resources may generate a significant amount of heat, and the computing environment 100 may include an integrated cooling system to remove heat from the enclosure 101. In some implementations, the integrated cooling system includes a number of heat exchangers 116 and a number of fans or pumps 119 to circulate cooling fluid (e.g., water or refrigerant) and/or fluid to be treated (e.g., air) through the heat exchangers 116. The cooling fluid may be cycled through a system external to the enclosure 101, where the heat may be removed.

The computing environment 100 also includes a power distribution system that receives power from outside the enclosure and distributes it to various loads within the enclosure. Power may be received through a connection 128 to an external power supply. Once inside the enclosure, the power may be routed to a power distribution box 131 and distributed through a number of circuits to power the computing resources, cooling system, network switching equipment and other electrical loads within the enclosure 101. The power distribution box 131 may include various circuit breakers or other over-current protection for each circuit, and each circuit may also include surge suppression devices or filters to smooth out the power or to prevent high frequency noise generated within the enclosure from being coupled into the power supply outside the enclosure. Individual circuits may be designed to minimize disruptions caused by failure of a single circuit.

The computing environment 100 includes ports that facilitate quick connection to utilities and other services required for operation. For example, as shown in FIG. 1 and described above, a power port 149 is provided to supply power to the computing environment 100 via the power supply connection 128. One or more network interface connections 158 are provided to couple an external network to the example computing environment 100 via the high-bandwidth connection 113.

As can be appreciated with reference to FIG. 1, ensuring that devices of a computing environment are correctly wired can be a complex problem. Even for the single patch panel device 107 shown in computing environment 100, several hundred physical connections may be used to interface the patch panel device 107 with various processor boards 104. Because such physical connections are often manually established by a technician or team of technicians, for example, the potential for wiring errors can be high, and when such errors occur, significant delay can result.

As will be discussed in more detail below, connectivity within the computing environment 100 may be quickly and conveniently determined or verified using techniques described herein. In some implementations, a computing device 112 can execute instructions that implement the techniques discussed herein. For example, for each port of the patch panel 107, it can be determined which processor board 104, or alternatively which interface port of a particular processor board 104, is physically connected via wire or cable to the particular patch panel port. Using this information, data center or computing environment blueprint or connectivity map data may be verified or tested. If the determined connectivity differs from an expected connectivity, for example as indicated on a connectivity blueprint or map for the computing environment, the deviations may quickly be identified and corrected. Devices that are connected incorrectly may be identified, and wiring corrections may be made. Defective wires or cables may similarly be detected and replaced. In some implementations, connectivity information can likewise be determined for data centers or computing environments for which a blueprint or connectivity map data does not exist or is incomplete, and a blueprint can be generated.

Figure 2:
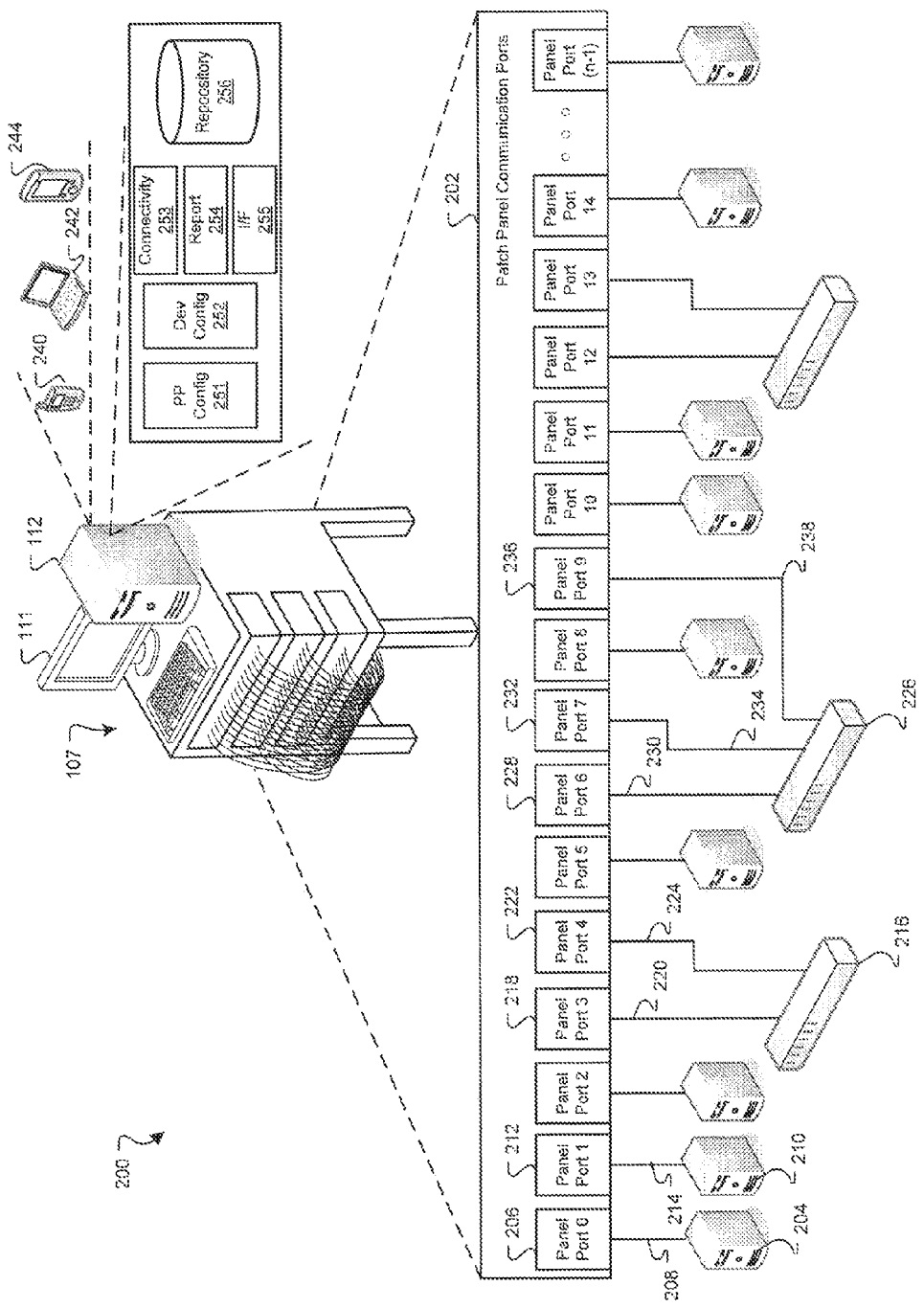
FIG. 2 is a block diagram that shows an example representation of various devices connected to a patch panel device.

FIG. 2 is a block diagram 200 that shows an example representation of various devices connected to a patch panel device. The generic representation of the patch panel device 107 is repeated here, along with an example representation of a set of communication ports 202 of the patch panel device 107. In this example, the patch panel device 107 is shown as including n ports, numbered generically from 0 to n−1. The ports may represent jacks or connectors into which a physical communication link, such as a wire or cable, may be plugged, for example.

In some implementations, each of the ports in the set of ports 202 may be associated with a unique number or identifier. In some implementations, the number may be represented as a binary number that includes a number of binary digits sufficient to represent the number of ports in the set 202, for example. In the depicted example, the number of ports is generically represented as "n" (numbered from zero to n−1). In general, a number of binary digits sufficient to represent n ports is $\log_2$ (n) if n is a power-of-2 (e.g., 2, 4, 8, 16, 32, 64, and so on), or ceiling[$\log_2$ (n)] if n is not a power-of-2, where "ceiling [ ]" is the "ceiling function" from mathematics that maps a real number to the smallest integer number that is larger than or equal to the real number. For example, for a patch panel that includes 1,024 ports, binary numbers that include ten binary digits will suffice to represent each of the 1,024 ports as a unique binary number. For a patch panel that includes 1,025 ports, binary numbers that include eleven binary digits will suffice. As a simple example, for a patch panel that includes 32 ports, five binary digits are sufficient to represent a unique binary number associated with each of the ports, for example when the ports are numbered 0-31. In this example, patch panel port 0 may be represented as the binary number "00000;" patch panel port 1 may be represented as the binary number "00001;" patch panel port 12 may be represented as the binary number "01100;" patch panel port 15 may be represented as the binary number "01111," and so on.

Various devices are shown physically coupled to the ports 202 of the patch panel device 107. A first device 204 is coupled to patch panel port #0 (206) via a physical communication link 208, such as a cable (e.g., a fiber optic cable) or wire (e.g., a copper wire). In some implementations, device 204 is a server, such as a host server. While device 204 includes a case as depicted in FIG. 2, in some implementations server 204 may be a processor board within a rack system, such as previously described above with reference to FIG. 1. The physical communication link 208 is connected at one end to patch panel port #0 (206) and at its other end to an interface port (not shown) of device 204. Because they are physically connected by communication link 208, patch panel port #0 (206) may be associated with device 204, or with the port of device 204 to which it is connected. In some implementations, device 204 includes a single interface port, while in other implementations it includes multiple interface ports. A second device 210, which may also be a server, is coupled to patch panel port #1 (212) via physical communication link 214. Other servers are shown connected to patch panel ports #2, #5, #8, #10, #11, #14, and #(n−1).

Some devices may include more than one interface port, and may be physically coupled to more than one patch panel port. For example, a third device 216 is coupled from a first interface port (not shown) to patch panel port #3 (218) via a physical communication link 220, and is coupled from a second interface port (not shown) to patch panel port #4 (222) via a physical communication link 224. In some implementations, device 216 is a switching device, and while it is depicted in FIG. 2 as including a case, in various implementations may be a processor board within a rack system, such as previously described above with reference to FIG. 1. Because they are physically connected by communication link 220, patch panel port #3 (218) may be associated with device 216, or with the first interface port of device 216, to which it is connected by communication link 220. Similarly, patch panel port #4 (222) may be associated with device 216, or with the second interface port of device 216, to which it is connected by communication link 224. A fourth device 226, which may also be a switching device, is coupled to patch panel port #6 (228) via a physical communication link 230, is coupled to patch panel port #7 (232) via a physical communication link 234, and is coupled to patch panel port #9 (236) via a physical communication link 238. Another switching device is shown connected to patch panel ports #12 and #13. In various implementations, switching devices may have any appropriate number of interface ports, some or all of which may be connected to ports of the patch panel.

Computing device 112 may be used to verify or determine connectivity between devices in a computing environment. In some implementations, device 112 may comprise a desktop computer or server, and in other implementations may comprise a portable or mobile device, such as a smartphone 240, a laptop computer 242, or a PDA or tablet computing device 244. In the examples discussed herein, it will be assumed that device 112 is a desktop computer or server, but it will be understood that in various implementations the techniques discussed herein may alternatively be performed, in whole or in part, by one or more of devices 240, 242, 244, or other appropriate computing device.

In some implementations, computing device 112 includes a patch panel configuration module 251 that can be used to configure a patch panel device, such as device 107. Computing device 112 also a device configuration module 252, in some implementations, that can be used to configure devices such as processor boards 104 (FIG. 1), or server devices or switch devices shown in FIG. 2 and in the examples of FIGS. 4A-C and 6A-B. In some implementations, computing device 112 includes a connectivity determination module 253 that can be used to determine connectivity among devices. For example, module 253 can be used to determine physical connections between a server or switch and a patch panel device in a computing environment. In some implementations, computing device 112 includes a report generation module 254 that can be used to generate a connectivity report, such as a connectivity map, blueprint, list, matrix, or other type of output that indicates connectivity information for devices in a computing environment or data center. In some implementations, computing device 112 includes an interface module 255 that can be used to communicate with devices in a computing environment, such as a patch panel device, server, switch, mobile device (e.g., PDA, smartphone, tablet computing device, laptop, and the like), I/O device (display monitor, printer, speaker, projector, keyboard, pointing device, and others). In some implementations, device 112 includes a repository 256 that can be used to store information pertaining to devices in a computing environment, connectivity statuses for devices or ports in a computing environment, connectivity reports or blueprints, expected connectivity information, diagnostic reports, audit information, test schedule information, error information, and the like.

In various implementations, computing device 112 may communicate with the patch panel device 107, and with any of the servers or switches (e.g., servers 204, 210 and switches 216, 226) shown in FIG. 2 or, more generally, with any of the processor boards 104 shown in FIG. 1.

For example, computing device 112 may send one or more messages to patch panel device 107 that include configuration instructions for the ports of the patch panel. Patch panel port configuration instructions can include activating a patch panel port or deactivating a patch panel port, for example. Configuration instructions can also include configuring a patch panel port to cause any packet received at the port (from a sending device) to be sent back or returned to the sending device via the same patch panel port, which may be referred to a loopback configuration for the patch panel port. Configuration instructions may also be used to establish connections between patch panel ports through the patch panel device 107, so that any data packets received at a first patch panel port, from a sending device physically connected to the first patch panel port, are transmitted from a second patch panel port for receipt by a receiving device physically connected to the second patch panel port.

Computing device 112 may also send one or more messages to devices (e.g., servers or switches) in the computing environment. The messages to the servers or switches can include instructions to create data packets or transmit data packets from interface ports of the servers or switches, for example, or can include instructions for processing or interpreting data packets received at interface ports of the servers or switches. For example, device 112 may send a message to server 204 that instructs server 204 to transmit a data packet from the interface port of server 204. As can be seen with reference to FIG. 2, the transmitted data packet may be received at patch panel port #0 (206) via physical communication link 208. As another example, device 112 may send a message to server 204 or switch 216 that instructs the server or switch to monitor for a message at a port of the server or switch, and to provide an indication of whether or not a message is received. The device 112 may receive the indication from the server or switch.

Figure 3:
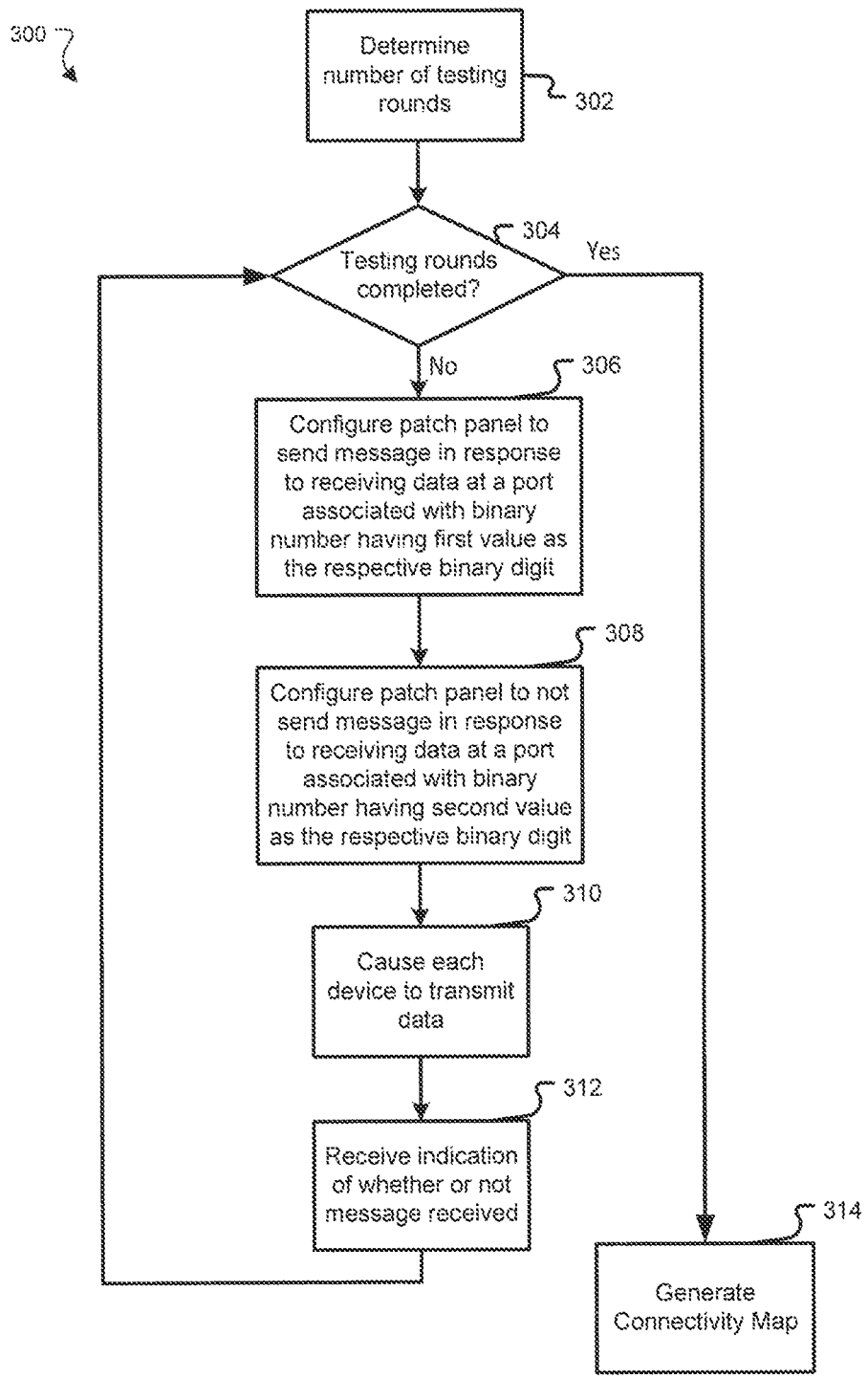
FIG. 3 is a flow chart that illustrates an example of a process that can be used to determine physical connectivity between devices.

FIG. 3 is a flow chart 300 that illustrates an example of a process that can be used to determine physical connectivity between devices. For example, a computing environment may include a patch panel device that includes a predetermined number of communication ports, as well as a plurality of computing devices, such as servers or switches, that may be physically connected to communication ports of the patch panel via physical communication links (e.g., wires or fiber optic cables). Each communication port of the patch panel device may be associated with a unique number, where the unique number may be represented as a unique binary number. In some implementations, the process may be used to determine, for each communication port of the patch panel device, which computing device or interface port of a particular computing device is physically connected to the respective patch panel communication port via a physical communication link.

A number of testing rounds is determined at step 302. The testing rounds may represent portions of a test to determine connectivity among devices, and in some implementations the number of testing rounds may be equal to a number of binary digits sufficient to represent a number of communications ports of a patch panel device, where each communication port of the patch panel device is associated with a unique binary number. For a generic number of patch panel communication ports k, the number of binary digits sufficient to represent k ports is $\log_2(k)$ if k is a power-of-2, or ceiling[$\log_2(k)$] if k is not a power-of-2.

At step 304, it is determined whether all of the testing rounds have been completed. Each of the testing rounds may be associated with a respective binary digit of the number of binary digits sufficient to represent the number of communications ports of the patch panel device. The testing rounds may be executed sequentially, for example, where a first testing round may be associated with a least significant bit or digit position of the binary numbers, a second testing round may be associated with a second bit or digit position of the binary numbers, and so on.

As a simple example for a patch panel device that includes 16 communications ports, binary numbers that include four binary digits may be sufficient to uniquely identify each of the sixteen ports, and the number of testing rounds determined at step 302 can be four, one for each of the digits of the binary number. The first testing round can be associated with the first (least significant) binary digit of the binary numbers; the second testing round can be associated with the second binary digit of the binary numbers; the third testing round can be associated with the third binary digit of the binary numbers; and the fourth testing round can be associated with the fourth (most significant) binary digit of the binary numbers. A counter can be used to keep track of the current testing round, and can be incremented at the completion of each testing round, for example. In other examples, the testing rounds can be associated with different bit positions of the binary numbers, such as beginning from most significant bit and ending with least significant bit, for example.

If all of the testing rounds have not yet been completed at step 304, at step 306 the patch panel is configured to send a message in response to receiving data at a patch panel port associated with a binary number having a first value as the respective binary digit. In some implementations, the patch panel may be configured by instructions received from a central controller, such as computing device 112, for example. The respective binary digit may correspond to the digit or digit position of the binary number associated with the current testing round, for example. The message may be sent, for example, to a first sending device from which the data was received. In some implementations, the message may comprise the data received at the patch panel port. For example, the patch panel may be configured to treat such ports as operating in a loopback mode, so that data received at the patch panel port over a physical communication link is transmitted back out the patch panel port over the same physical communication link. In some implementations, the message may be additionally or alternatively sent to a central controller, for example. In some implementations, the first value may be "1". In some implementations, the first value may be "0". In some implementations, the message may be sent wirelessly, rather than over the physical communication link, for example, or over another physical communication link (for example, if being sent to a central controller).

At step 308, the patch panel is configured to not send a message in response to receiving data at a patch panel port associated with a binary number having a second value, different from the first value, as the respective binary digit. In some implementations, the patch panel may be configured by instructions received from a central controller, such as computing device 112, for example. For example, the patch panel may be configured to treat such ports as deactivated, so that data received at the patch panel port over a physical communication link is dropped, disregarded, or ignored. In implementations where the first value is a "1", the second value may be a "0", for example. In implementations where the first value is a "0", the second value may be a "1", for example.

At step 310, each device of the plurality of computing devices is caused to transmit data from one or more interface ports. In some implementations, each device is caused to transmit data from each of its interface ports. In some implementations, one or more devices are caused to transmit data from a subset of its total number of interface ports. For example, each device may be commanded to transmit a data packet from an interface port of the computing device, to which a physical communication link (e.g., wire or optic cable) is attached at a first end and is attached at a second end to a communication port of the patch panel device. In some implementations, the transmitted data may be referred to as a probe. In various implementations, the transmitted data may include any appropriate information. In some examples, the transmitted data includes an indication of the sending device, or an indication of the respective interface port of the sending device. In some examples, the transmitted data includes a test message or code. In some examples, the transmitted data includes an indication of the current testing round. In some examples, the transmitted data includes an indication of the expected number of testing rounds, or of both the current testing round and the expected number of testing rounds (e.g., round 2 of 5). In some examples, the transmitted data includes randomized data. In some implementations, the transmitted data includes an indication of a destination, while in other implementations the transmitted data does not include an indication of a destination. In some implementations, the transmitted data is part of an existing protocol that the sending device executes as part of a standard operating procedure.

At step 312, an indication of whether or not a respective device received a message following the transmission of the data is received. In some implementations, an indication is received from each device of the plurality of computing devices. In some implementations, an indication is received only from those devices that did receive a message following the transmission of the data. In some implementations, the respective computing device may record the indication. For example, the device may record whether or not it receives a message within a predetermined time period following its transmission of the data in step 310. A timer or counter may be used to measure the time period, in some examples. In some implementations, a central controller may record the indication.

In some implementations, over the course of the test, a binary number can be determined for each device of the plurality of computing devices (or for each port of each such device), where each digit of the respective binary number is determined based on whether or not a message was received at step 312 in response to the transmission of data at step 310. For example, if a message is received within a predetermined time, a first value, which may be the same as the first value at step 306, may be recorded in the current digit position corresponding to the current testing round for the respective binary number. If a message is not received within a predetermined time, a second value, which may be the same as the second value at step 308, may be recorded. In this manner, after completion of all of the testing rounds, the determined binary number for a particular computing device or port of the computing device may match the binary number associated with the patch panel port to which the computing device or computing device port is physically coupled. The process continues with a determination of whether all of the testing rounds have been completed at step 304. If not, another testing round is executed at steps 304-312.

When all of the testing rounds have been completed, a connectivity map can be generated at step 314. The connectivity map can take various forms, depending on the implementation. One example of a connectivity map includes an indication of the computing device or of the particular interface port of the computing device to which each of the respective communication ports of the patch panel device is connected. Such a list can be presented as a series of ordered pairs, for example. Alternatively, such a list can be conveyed by listing in a particular order (e.g., an order from first to last or last to first) the indications of the computing devices or of the ports of the computing devices to which the patch panel ports are coupled. As another example, the connectivity map can include a block diagram that shows each patch panel communication port and each computing device or computing device interface port and can include an indication (e.g., a connecting line or arrow) of how the ports are physically connected, such as a wiring blueprint.

In some implementations, the determined connectivity information may be compared against expected connectivity information, and any errors or discrepancies may be determined. For example, the determined connectivity information (e.g., the connectivity map) may be compared to a reference connectivity map that details how a computing environment is expected to be wired. In some examples, the connectivity map generated at step 314 can include indications of errors or discrepancies in the actual connectivity of a computing environment as compared to an expected connectivity for the computing environment. For example, the connectivity map may include a listing of those patch panel communication ports (and/or computing device interface ports) that are incorrectly wired or appear to be incorrectly wired.

In some examples, the generated connectivity map can be color-coded. For example, the connectivity map may present patch panel ports and/or computing device ports that are correctly wired as associated with a green color, and may present patch panel ports and/or computing device ports that are incorrectly wired as associated with a red color. The connectivity map information may be displayed to a user on a display screen of a computing device. For example, the connectivity map may be displayed on a screen of the smartphone 240, laptop computer 242, PDA or tablet computing device 244, or the display monitor 111.

In some examples, generation of the connectivity map may be an iterative procedure, portions of which can occur at each testing round. For example, some implementations of process 300 may include an additional step (not shown) that follows step 312. A connectivity map may be updated based on information learned during the current testing round, after which the process returns to step 304. Such an implementation may provide feedback while the test is running, for example.

Figure 4A:
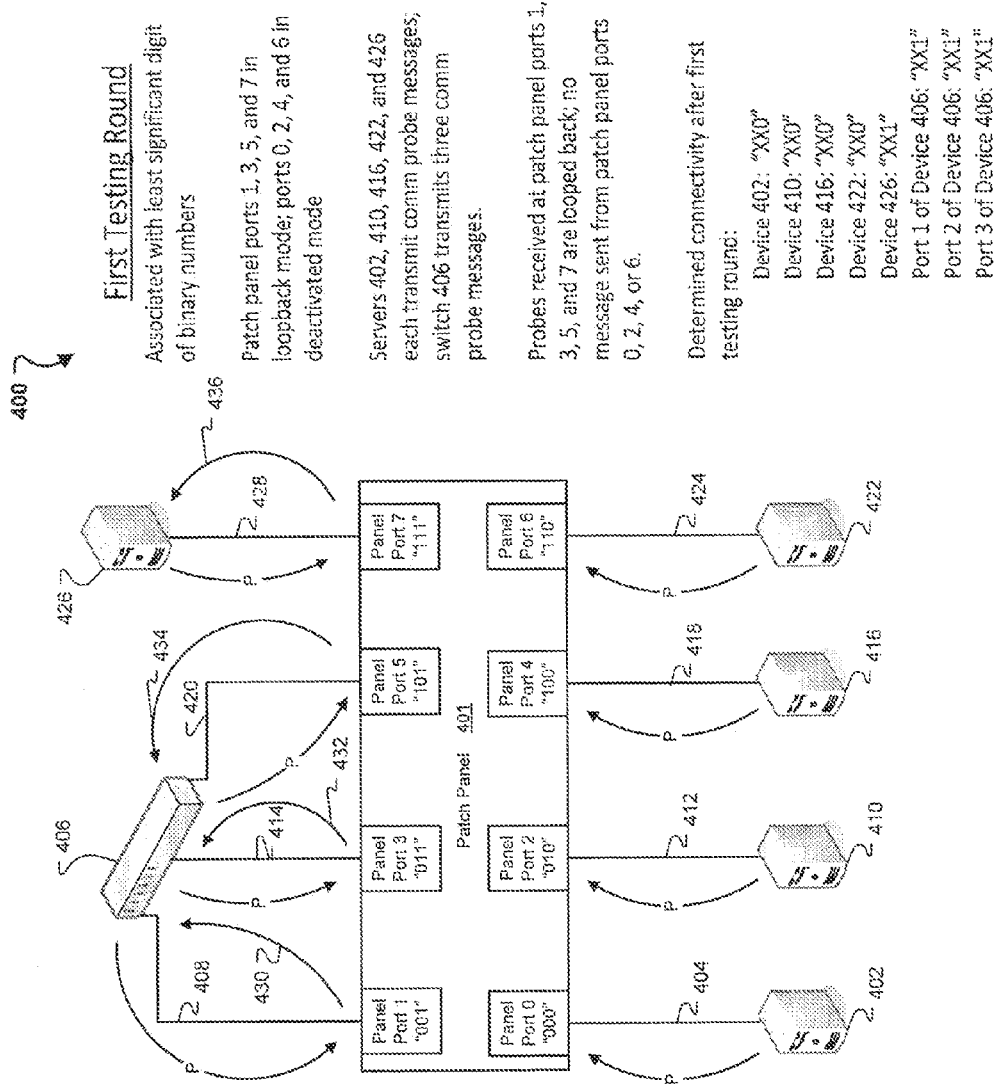
FIGS. 4A, 4B, and 4C are block diagrams that illustrate example testing rounds of an example connectivity test.
Figure 4B:
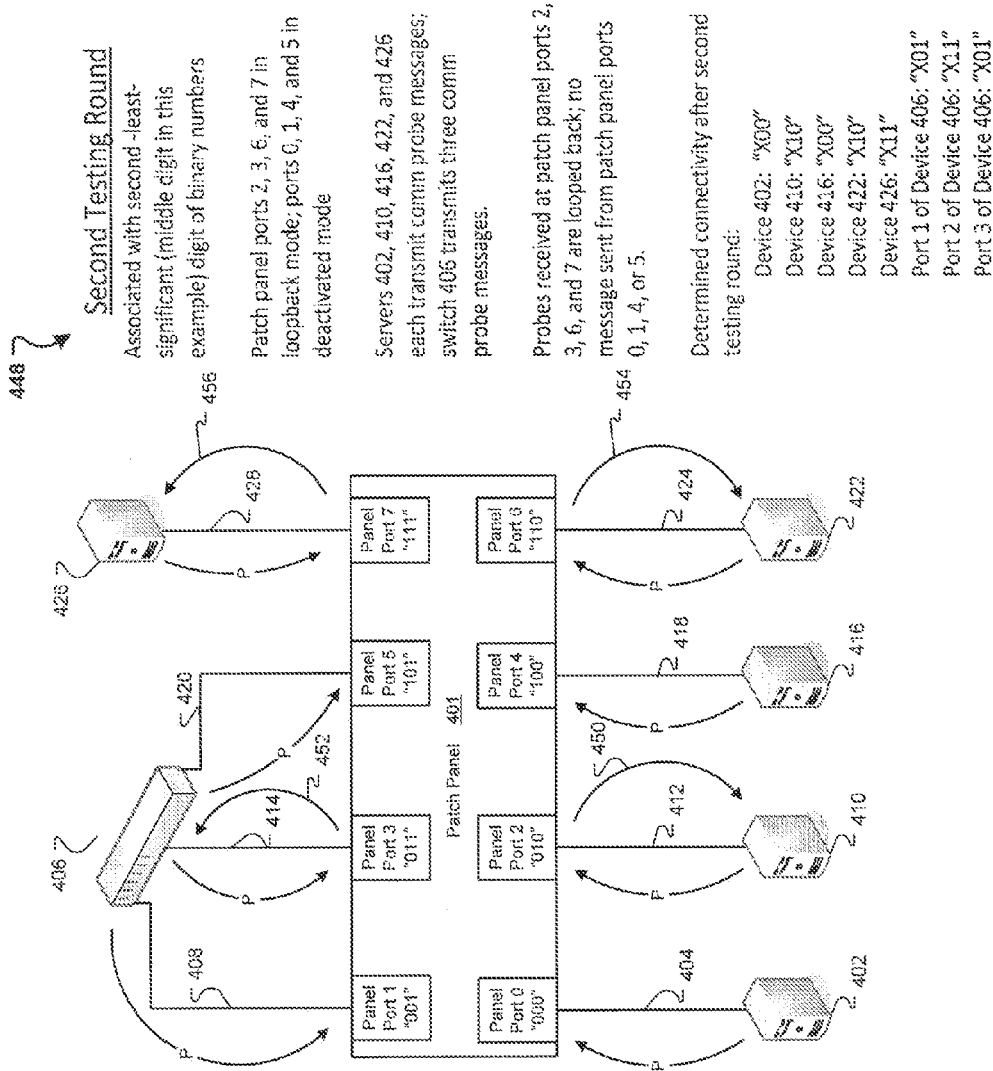
Figure 4C:
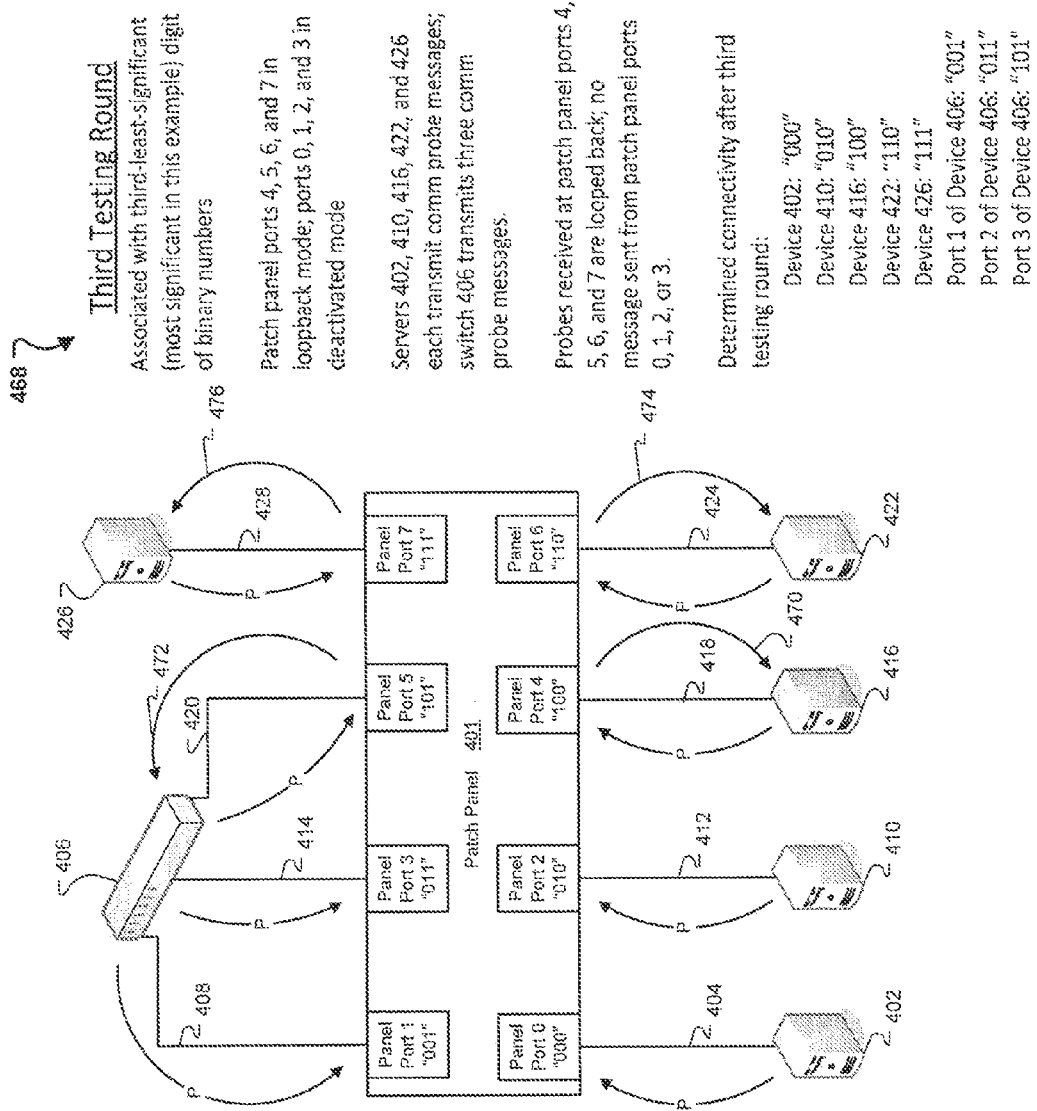

FIGS. 4A, 4B, and 4C are block diagrams that illustrate example testing rounds of an example connectivity test. A simple example patch panel device 401 includes eight patch panel communication ports, respectively numbered 0-7. Because there are eight patch panel communication ports, each of the ports may be associated with a unique three-digit binary number because eight is a power-of-two, and $\log_2 8=3$. The connectively test then, in this example, may include three testing rounds, a first of which is illustrated in FIG. 4A, a second of which is illustrated in FIG. 4B, and a third of which is illustrated in FIG. 4C. The binary numbers associated with each of the eight patch panel ports represent the binary encodings of the respective port numbers: "000" for patch panel port 0; "001" for patch panel port 1; "010" for patch panel port 2; "011" for patch panel port 3; "100" for patch panel port 4; "101" for patch panel port 5; "110 for patch panel port 6; and "111" for patch panel port 7.

As can be seen in each of the FIGS. 4A, 4B, 4C, patch panel port 0 is connected to an interface port of a first device 402 by communication link 404. Patch panel port 1 is connected to a first interface port of a second device 406 by communication link 408. Patch panel port 2 is connected to an interface port of a third device 410 by communication link 412. Patch panel port 3 is connected to a second interface port of the second device 406 by communication link 414. Patch panel port 4 is connected to an interface port of a fourth device 416 by communication link 418. Patch panel port 5 is connected to a third interface port of the second device 406 by communication link 420. Patch panel port 6 is connected to an interface port of a fifth device 422 by communication link 424. Patch panel port 7 is connected to an interface port of a sixth device 426 by communication link 428.

With reference to FIG. 4A, an example first testing round 400 is illustrated. In some implementations, the first testing round may be associated with a least significant digit position of the binary numbers associated with the patch panel communication ports. In some implementations, for the first testing round the patch panel 401 may be configured to treat patch panel ports associated with a binary number having a first value as the least significant digit as operating in a loopback mode. For example, the patch panel 401 may be configured to send a message to a first sending device in response to receiving data at a patch panel communication port associated with a binary number having a first value as the respective binary digit, the received data having been received from the first sending device. In this example, the first value may equal "1" so that patch panel ports 1, 3, 5, and 7 are configured in loopback mode. In some implementations, the message that the patch panel sends is the same data that was received at the patch panel port—that is, the received data is "looped back" to the sending device via the same patch panel port and same physical communication link. In other implementations, the message can be sent directly to a central controller, such as device 112 (see FIGS. 1, 2), by wired or wireless (if supported) transmission, or sent to the sending device via a wireless transmission (if supported).

Additionally, as part of the first testing round, the patch panel device 401 may be configured to treat as deactivated those patch panel ports associated with a binary number having a second value that is different from the first value as the least significant digit. For example, the patch panel device 401 may be configured to not send a message to a second sending device in response to receiving data at a patch panel communication port associated with a binary number having the second value as the respective binary digit. In some implementations, data received at a deactivated patch panel port may be dropped, discarded, or ignored. In this example, the second value may equal "0," so that patch panel ports 0, 2, 4, and 6 are configured in a deactivated mode.

Next, each device 402, 406, 410, 416, 422, and 426 of the set of devices coupled to the patch panel device 401 can be caused to transmit data over the corresponding physical communication link or links that couple the respective device 402, 406, 410, 416, 422, and 426 to the patch panel device 401. For example, a central controller such as device 112 may send a command to each of the devices 402, 406, 410, 416, 422, and 426 that instructs the devices to transmit data. In some implementations, the data may be a data packet. Optionally, the data can include one or more of an indication of the sending device, a port associated with the sending device, or an indication of both the sending device and a port of the sending device. The data transmitted by the various devices 402, 406, 410, 416, 422, and 426 may be referred to as a probe, and is illustrated in FIG. 4A by arrows labeled "P" that go from ports of the devices 402, 406, 410, 416, 422, and 426, over a physical communication link, to a port of the patch panel device 401. In some implementations, each of the devices 402, 406, 410, 416, 422, and 426 may transmit their probes substantially simultaneously or in parallel, or at least within a short time of one another.

Based on the configuration of patch panel device 401 for the first testing round, as described above, the patch panel device 401 may drop or ignore the probes sent from devices 402, 410, 416, and 422, because those probes are received, respectively, at patch panel ports 0, 2, 4, and 6. As described above, the patch panel device 401 treats each of the patch panel ports 0, 2, 4, and 6 as deactivated during the first testing round because the ports are each associated with a binary number having a least significant digit of "0" (i.e., the second value in this example). Moreover, the patch panel device 401 may not send a message in response to receipt of the probes at patch panel ports 0, 2, 4, and 6, and devices 402, 410, 416, and 422 may not receive a message within a predetermined time following their transmission of the probes.

Based on the configuration of patch panel device 401 for the first testing round, as described above, the patch panel device 401 may loop back (that is, transmit back) the probes sent from the first, second and third ports of device 406, and from device 426, because those probes are received, respectively, at patch panel ports 1, 3, 5, and 7. As described above, the patch panel device 401 treats each of the patch panel ports 1, 3, 5, and 7 as ports in loopback mode during the first testing round because the ports are each associated with a binary number having a least significant digit of "1" (i.e., the first value in this example).

For example, in response to the data received at patch panel port 1, which was sent over communication link 408 from a first port of device 406, the patch panel device 401 may transmit a message 430 from patch panel port 1 over communication link 408, for receipt at the first port of device 406. Similarly, in response to the data received at patch panel port 3, which was sent over communication link 414 from a second port of device 406, the patch panel device 401 may transmit a message 432 from patch panel port 3 over communication link 414, for receipt at the second port of device 406. Also, in response to the data received at patch panel port 5, which was sent over communication link 420 from a third port of device 406, the patch panel device 401 may transmit a message 434 from patch panel port 5 over communication link 420, for receipt at the third port of device 406. Finally, in response to the data received at patch panel port 7, which was sent over communication link 428 from device 426, the patch panel device 401 may transmit a message 436 from patch panel port 7 over communication link 428, for receipt at device 426.

In some implementations, an indication is received, for each device 402, 406, 410, 416, 422, and 426 of the plurality of devices, of whether or not the respective device received a message following the transmission of the data. For example, each of the devices 402, 406, 410, 416, 422, and 426, following the aforementioned transmission of the data probe from an interface port or ports of the respective device, may monitor for an incoming message on the same interface port or ports for a predetermined time period, and may send an indication of whether such a message was received. The indication may be received, for example, by a central controller, such as device 112. Devices that have more than one interface port and for which more than one probe was transmitted, such as device 406, may monitor for incoming messages at each of the interface ports, and may send indications of whether or not a message was received for each of the interface ports.

In some implementations, the received indications may be used to generate a digit of a connectivity number associated with each of the devices 402, 406, 410, 416, 422, and 426, or with each of the interface ports of the devices. In some implementations, the generated connectivity number may indicate, for example, the patch panel communication port to which the device or device interface port is physically coupled, and this information can then be used to generate a connectivity map. One digit of each of the connectivity numbers may be generated at each testing round, and the digit may correspond to the digit position of the binary number associated with the current testing round. For the first testing round in this example, a least significant digit of the numbers may be generated, for example. In some implementations, a central controller (e.g., device 112) may generate the connectivity numbers. In some implementations, the individual devices 402, 406, 410, 416, 422, and 426 may generate the connectivity numbers.

For device 402, which may not have received a message in response to the probe that it transmitted during the first testing round, a first round connectivity number of "XX0" may be generated, where "X" indicates an as-yet-unknown digit of the number, and "0" indicates that a message was not received. Similarly, for each of devices 410, 416, and 422, first round connectivity numbers of "XX0" may also be generated because each of these devices may not have received a message in response to the probes transmitted during the first testing round. For device 426, which may have received a message 436 in response to the probe that it transmitted during the first testing round, a first round connectivity number of "XX1" may be generated, where "1" indicates that a message was received. Similarly, for each of the three interface ports of device 406, first round connectivity numbers of "XX1" may also be generated because each of these ports may have received a message.

With reference to FIG. 4B, an example second testing round 448 is illustrated. In some implementations, the second testing round may be associated with a second-least-significant digit (middle digit in this example) of the binary numbers associated with the patch panel communication ports. In some implementations, for the second testing round the patch panel device 401 may be configured to treat patch panel ports associated with a binary number having the first value ("1" in this example) as the second-least-significant digit as operating in a loopback mode. For example, patch panel ports 2, 3, 6, and 7 may be configured in loopback mode for the second testing round. The patch panel device 401 may be configured to treat as deactivated patch panel ports associated with a binary number having the second value ("0" in this example) as the second-least-significant digit—ports 0, 1, 4, and 5 in this example.

As was the case in the first testing round, each device 402, 406, 410, 416, 422, and 426 of the set of devices coupled to the patch panel device 401 can be caused to transmit a data probe. This is illustrated in FIG. 4B by arrows labeled "P" that go from ports of the devices 402, 406, 410, 416, 422, and 426, over a physical communication link, to a port of the patch panel device 401. In some implementations, each of the devices 402, 406, 410, 416, 422, and 426 may transmit their probes substantially simultaneously or in parallel, or at least within a short time of one another.

Based on the configuration of patch panel device 401 for the second testing round, as described above, the patch panel device 401 may drop or ignore the probes sent from devices 402 and 416, and from the first interface port and the third interface port of device 406, because those probes are received, respectively, at patch panel ports 0, 4, 1, and 5. As described above, the patch panel device 401 treats each of the patch panel ports 0, 1, 4, and 5 as deactivated during the second testing round because the ports are each associated with a binary number having a second-least-significant (middle, in this example) digit of "0" (i.e., the second value in this example). Moreover, the patch panel device 401 may not send a message in response to receipt of the probes at patch panel ports 0, 1, 4, and 5, and devices 402 and 416, as well as the first port and the third port of device 406, may not receive a message within a predetermined time following their transmission of the probes.

Based on the configuration of patch panel device 401 for the second testing round, as described above, the patch panel device 401 may loop back (that is, transmit back) the probes sent from devices 410, 422 and 428, and from the second port of device 406, because those probes are received, respectively, at patch panel ports 2, 6, 7, and 3. As described above, the patch panel device 401 treats each of the patch panel ports 2, 3, 6, and 7 as ports in loopback mode during the second testing round because the ports are each associated with a binary number having a second-least-significant (middle, in this example) digit of "1" (i.e., the first value in this example).

For example, in response to the data received at patch panel port 2, which was sent over communication link 412 from device 410, the patch panel device 401 may transmit a message 450 from patch panel port 2 over communication link 412, for receipt by device 410. Similarly, in response to the data received at patch panel port 6, which was sent over communication link 424 from device 422, the patch panel device 401 may transmit a message 454 from patch panel port 6 over communication link 424, for receipt by device 422. Also, in response to the data received at patch panel port 7, which was sent over communication link 428 from device 426, the patch panel device 401 may transmit a message 456 from patch panel port 7 over communication link 428, for receipt at device 426. Finally, in response to the data received at patch panel port 3, which was sent over communication link 414 from a second port of device 406, the patch panel device 401 may transmit a message 452 from patch panel port 3 over communication link 414, for receipt at the second port of device 406.

In some implementations, received indications of whether or not a device or device port received a message following the transmission of data can be used to supplement connectivity information learned during the first testing round. For example, a second digit of each of the connectivity numbers may be generated. For devices 402 and 418, and for the first port and third port of device 406, each of which may not have received a message in response to the probe that it transmitted during the second testing round, a "0" may be generated for the second digit of the respective connectivity numbers. For devices 410, 422 and 428, and for the second port of device 406, each of which may have received a message in response to transmitted probes, a "1" may be generated for the second digit of the respective connectivity numbers.

After the second testing round, then, the generated connectivity numbers for the various devices and ports may stand as follows: "X00" for device 402; "X10" for device 410; "X00" for device 416; "X10" for device 422; "X11" for device 426; "X01" for the first port of device 406; "X11" for the second port of deice 406; and "X01" for the third port of device 406.

With reference to FIG. 4C, an example third testing round 468 is illustrated. In some implementations, the third testing round may be associated with a third-least-significant (most significant, in this example) digit of the binary numbers associated with the patch panel communication ports. In some implementations, for the third testing round the patch panel device 401 may be configured to treat patch panel ports associated with a binary number having the first value ("1" in this example) as the third-least-significant digit as operating in a loopback mode. For example, patch panel ports 4, 5, 6, and 7 may be configured in loopback mode for the third testing round. The patch panel device 401 may be configured to treat as deactivated patch panel ports associated with a binary number having the second value ("0" in this example) as the third-least-significant digit—ports 0, 1, 2, and 3 in this example.

As was the case in the first and second testing rounds, each device 402, 406, 410, 416, 422, and 426 of the set of devices coupled to the patch panel device 401 can be caused to transmit a data probe. This is illustrated in FIG. 4C by arrows labeled "P" that go from ports of the devices 402, 406, 410, 416, 422, and 426, over a physical communication link, to a port of the patch panel device 401. In some implementations, each of the devices 402, 406, 410, 416, 422, and 426 may transmit their probes substantially simultaneously or in parallel, or at least within a short time of one another.

Based on the configuration of patch panel device 401 for the third testing round, as described above, the patch panel device 401 may drop or ignore the probes sent from devices 402 and 410, and from the first interface port and the second interface port of device 406, because those probes are received, respectively, at patch panel ports 0, 2, 1, and 3. As described above, the patch panel device 401 treats each of the patch panel ports 0, 1, 2, and 3 as deactivated during the third testing round because the ports are each associated with a binary number having a third-least-significant (most significant, in this example) digit of "0" (i.e., the second value in this example). Moreover, the patch panel device 401 may not send a message in response to receipt of the probes at patch panel ports 0, 1, 2, and 3, and devices 402 and 410, as well as the first port and the second port of device 406 may not receive a message within a predetermined time following their transmission of the probes.

Based on the configuration of patch panel device 401 for the third testing round, as described above, the patch panel device 401 may loop back (that is, transmit back) the probes sent from devices 416, 422 and 428, and from the third port of device 406, because those probes are received, respectively, at patch panel ports 4, 6, 7, and 5. As described above, the patch panel device 401 treats each of the patch panel ports 4, 5, 6, and 7 as ports in loopback mode during the third testing round because the ports are each associated with a binary number having a third-least-significant (most significant, in this example) digit of "1" (i.e., the first value in this example).

For example, in response to the data received at patch panel port 4, which was sent over communication link 418 from device 416, the patch panel device 401 may transmit a message 470 from patch panel port 4 over communication link 418, for receipt by device 416. Similarly, in response to the data received at patch panel port 6, which was sent over communication link 424 from device 422, the patch panel device 401 may transmit a message 474 from patch panel port 6 over communication link 424, for receipt by device 422. Also, in response to the data received at patch panel port 7, which was sent over communication link 428 from device 426, the patch panel device 401 may transmit a message 476 from patch panel port 7 over communication link 428, for receipt at device 426. Finally, in response to the data received at patch panel port 5, which was sent over communication link 420 from the third port of device 406, the patch panel device 401 may transmit a message 472 from patch panel port 5 over communication link 420, for receipt at the third port of device 406.

In some implementations, received indications of whether or not a device or device port received a message following the transmission of data can be used to supplement connectivity information learned during the first and second testing rounds. For example, a third digit of each of the connectivity numbers may be generated. For devices 402 and 410, and for the first port and second port of device 406, each of which may not have received a message in response to the probe that it transmitted during the third testing round, a "0" may be generated for the third digit of the respective connectivity numbers. For devices 416, 422 and 426, and for the third port of device 406, each of which may have received a message in response to transmitted probes, a "1" may be generated for the third digit of the respective connectivity numbers.

After the third testing round, then, the generated connectivity numbers for the various devices and ports may stand as follows: "000" for device 402, which may indicate that device 402 is physically coupled to patch panel port 0 ("000"); "010" for device 410, which may indicate that device 410 is physically coupled to patch panel port 2 ("010"); "100" for device 416, which may indicate that device 416 is physically coupled to patch panel port 4 ("100"); "110" for device 422, which may indicate that device 422 is physically coupled to patch panel port 6 ("110"); "111" for device 426, which may indicate that device 426 is physically coupled to patch panel port 7 ("111"); "001" for the first port of device 406, which may indicate that the first port of device 406 is physically coupled to patch panel port 1 ("001"); "011" for the second port of device 406, which may indicate that the second port of device 406 is physically coupled to patch panel port 3 ("011"); and "101" for the third port of device 406, which may indicate that the third port of device 406 is physically coupled to patch panel port 5 ("101").

For the described loopback connectivity test, at each round of the testing, one digit of the connectivity number may be determined for each of the devices. Complete connectivity information that fully specifies the connectivity topology can thus be determined in "ceiling[$\log_2$ (n)]" rounds of testing for n patch panel ports. Such complete connectivity information may be determined in a first instance, for example without any previous knowledge of how the computing environment is connected, or to verify, or identify errors if applicable, a preexisting connectivity map or matrix. As an example, complete connectivity information for a patch panel device that includes 512 ports, each connected to a server or switch device, can be determined in ceiling[$\log_2$ 512]=9 testing rounds using the loopback test, as described above.

Thus, the number of testing rounds for determining complete connectivity may be of "order $\log_2$ (n)," or simply, "order log (n)," which can be notated "O(log n)" using mathematical notation. This compares favorably with an approach that tests each port individually for connectivity, which may require one test round for each of the devices or device ports (e.g., 512 test rounds for the example of 512 server or switch ports). That is, to test each of the ports individually may require "order n" test rounds.

If fewer than ceiling[$\log_2$ (n)] testing rounds is desired for performing a verification test against a preexisting connectivity map or matrix, testing can be performed for k rounds, where k<$\log_2$ (n). In this case, testing will be 100% accurate in identifying failed or incorrectly wired ports, and will be correct with a probability of [k/ceiling[$\log_2$ n]] for ports that are correctly wired. Executing the test at this fewer number of testing rounds can be useful to provide a quick check of connectivity, albeit with less than complete knowledge of connectivity, when exact results are not needed.

In some implementations, when verification testing against a connectivity blueprint, testing at a particular device may be halted when it is determined that the device is incorrectly connected. For example, if it is determined that device X is incorrectly connected as compared to the blueprint at an intermediate testing round, subsequent testing rounds for that device may be skipped, as it is already known that the device is incorrectly wired. A technician may be dispatched to correct the problem, for example.

Another type of connectivity test, which may be referred to as the "golden test," involves starting from a known set of already-verified patch panel ports or connections. For example, a known or "golden" set of patch panel ports for which connectivity information to server or switch devices or ports is known and verified may provide an initial "golden" set of ports for the golden test. The test uses the verified patch panel ports and associated devices (e.g., servers or switches) or device ports, to which the verified patch panel ports are connected, to determine connectivity information for other patch panel ports connected to associated devices or device ports but for which such connectivity is either unknown or unverified.

Figure 5:
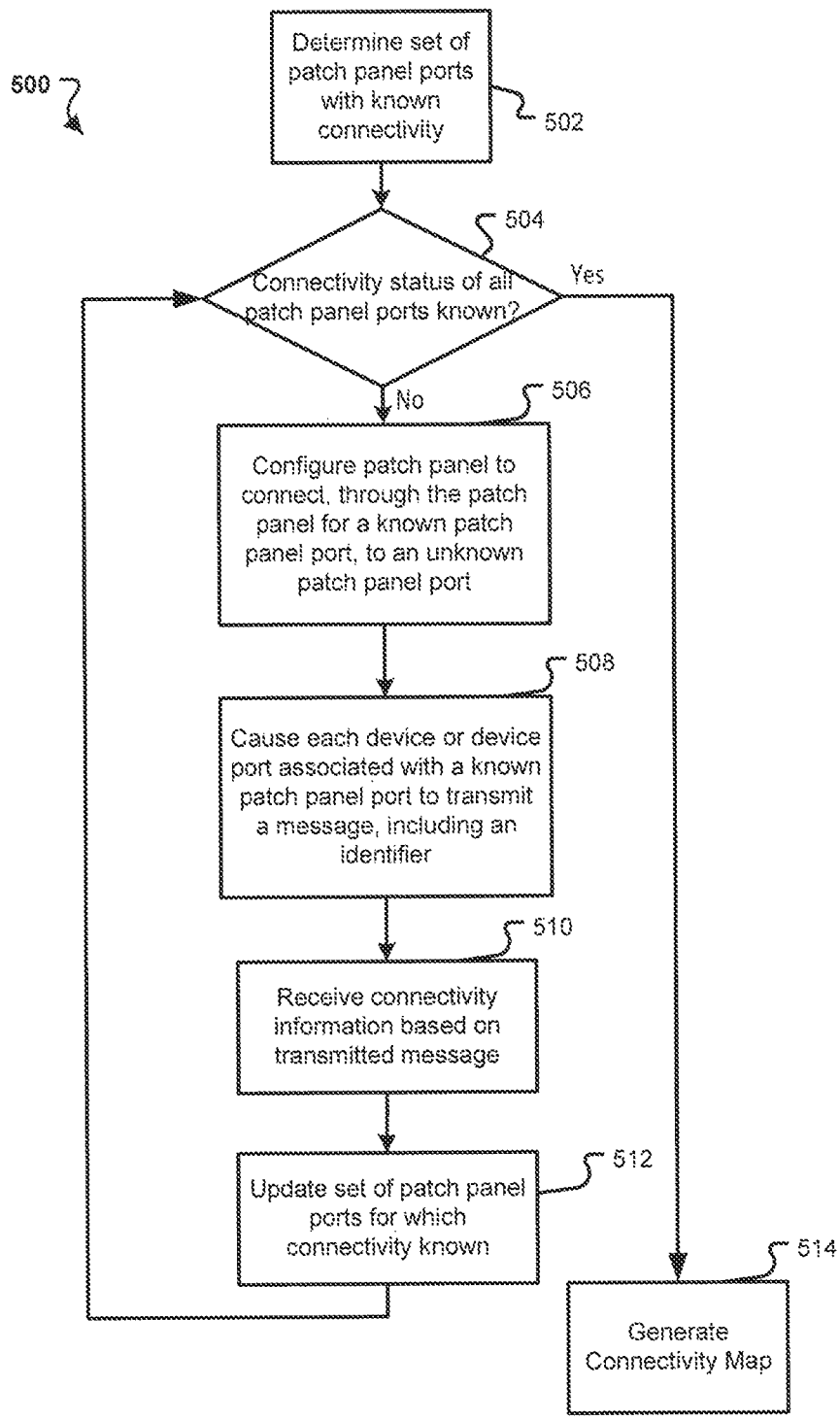
FIG. 5 is a flow chart that illustrates an example of a process that can be used to determine physical connectivity between devices.

FIG. 5 is a flow chart that illustrates an example of a process 500 that can be used to determine physical connectivity between devices. A set of patch panel ports whose connectivity information is known is determined at step 502. The set of known ports may be determined, for example, by accessing a list of known ports or by receiving an indication of the known ports. In some examples, the set may include only a single patch panel port, or a few patch panel ports. In some examples, such as when testing an expansion of a previously operational data center, the set may include a large number of patch panel ports. In some implementations, a patch panel port whose connectivity information is known is a patch panel port that is known to be physically connected by a physical communication link (e.g., wire or cable) to a specific and known computing device (e.g., a server or switch).

At step 504, it is determined whether a connectivity status for all patch panel ports is known. Examples of connectivity statuses can include "known good," which may indicate that the patch panel port is physically connected to an expected device or port, or "known bad," which may indicate that the patch panel port is not physically connected to the expected device or port but is physically connected to an identified and verified device or port. By contrast, patch panel ports for which connectivity information remains unknown are ports that may be physically connected to other devices or ports, but for which such connections have not yet been verified. The patch panel ports with unknown status can be tested so that their connectivity information may be determined.

If the connectivity status of all patch panel ports is not known, meaning that the connectivity status for at least one patch panel port remains unknown, at step 506 the patch panel device may be configured to establish connections between patch panel ports whose connectivity is known and patch panel ports whose connectivity remains unknown. The connections may be "soft connections" made between the patch panel ports through the patch panel device, for example. In some implementations, the patch panel device can be configured to establish a connection, for each known and verified patch panel port, that connects the known and verified patch panel port with an unknown patch panel port. With the patch panel device so configured, a data packet arriving at a known patch panel port will be transmitted over the soft connection through the patch panel to the corresponding unknown patch panel port, from which it can be transmitted for receipt by a device that is physically coupled to the unknown patch panel port.

Each device or device port associated with a known and verified patch panel port can be caused to transmit a message that includes an identifier at step 508. Such device or device port may be that to which the known and verified patch panel port is physically coupled by wire or cable. For example, computing device 112 may send a message that so instructs each device that has one or more ports associated with a known and verified patch panel port. In some implementations, the identifier may identify the device or device port, or may identify the corresponding known patch panel port, or a combination of the foregoing, for example.

Connectivity information can be received at step 510, where the connectivity information is based on the transmitted messages. For example, computing device 112 may receive a message that includes connectivity information from devices that receive a message with identifier that was sent at step 508. The connectivity information can include, for example, the identifier included in the transmitted message at step 508 (which may be referred to as a first identifier), and an identifier associated with the device that received the message and identifier transmitted at step 508 (which may be referred to as a second identifier). The connectivity information can be used to determine connectivity in the computing environment. In some implementations, the computing device 112 can use the first and second identifiers, and the patch panel device soft connection information to determine connection information for patch panel ports whose connection information was previously unknown.

At step 512, the set of patch panel ports for which connectivity is known can be updated. The process continues with a determination of whether the connectivity status of all patch panel ports is known at step 504. If not, another testing round is executed at steps 506-512.

When the connectivity status of all patch panel ports is known at step 504, a connectivity map can be generated at step 514. The connectivity map can take various forms, depending on the implementation, including any of the forms discussed above.

Figure 6A:
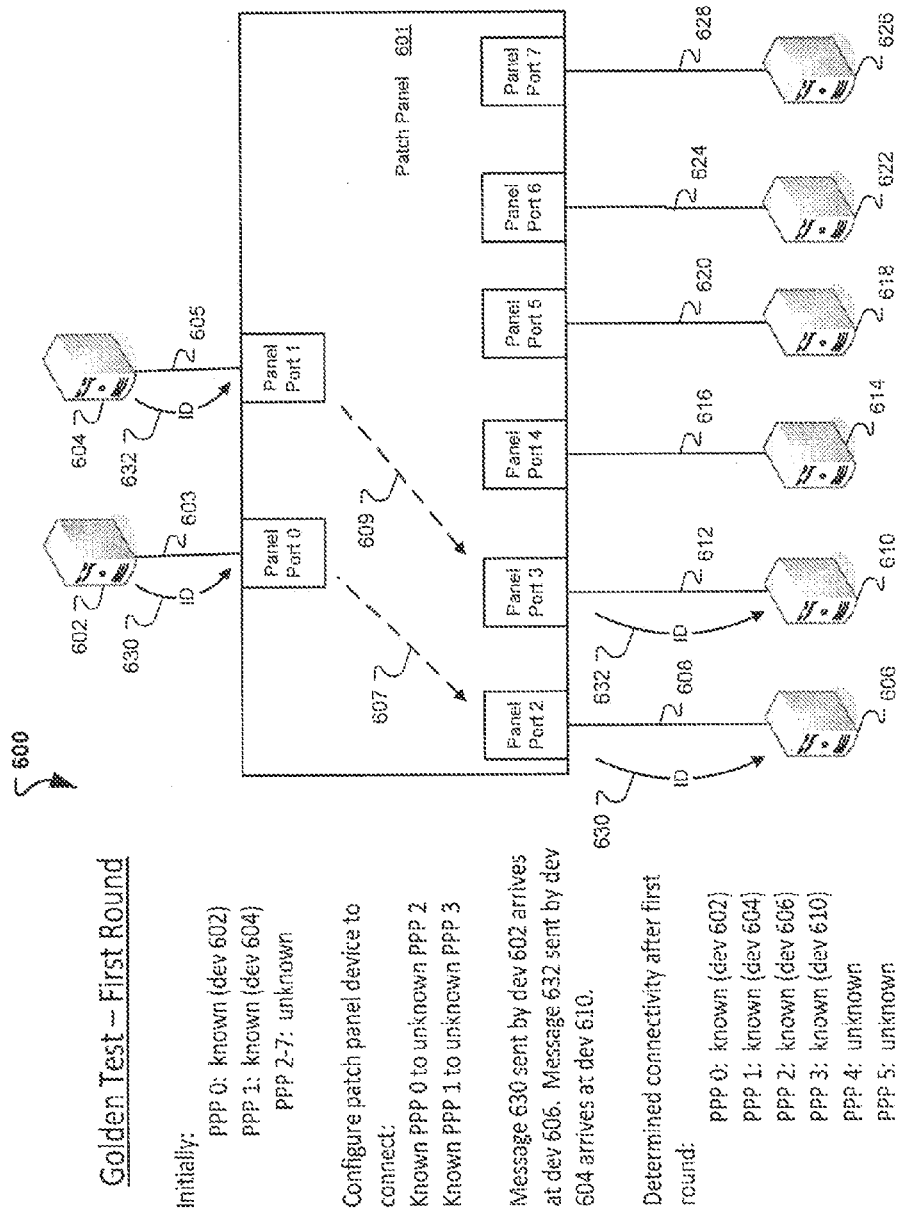
FIGS. 6A and 6B are block diagrams that illustrate example test rounds of an example connectivity test.
Figure 6B:
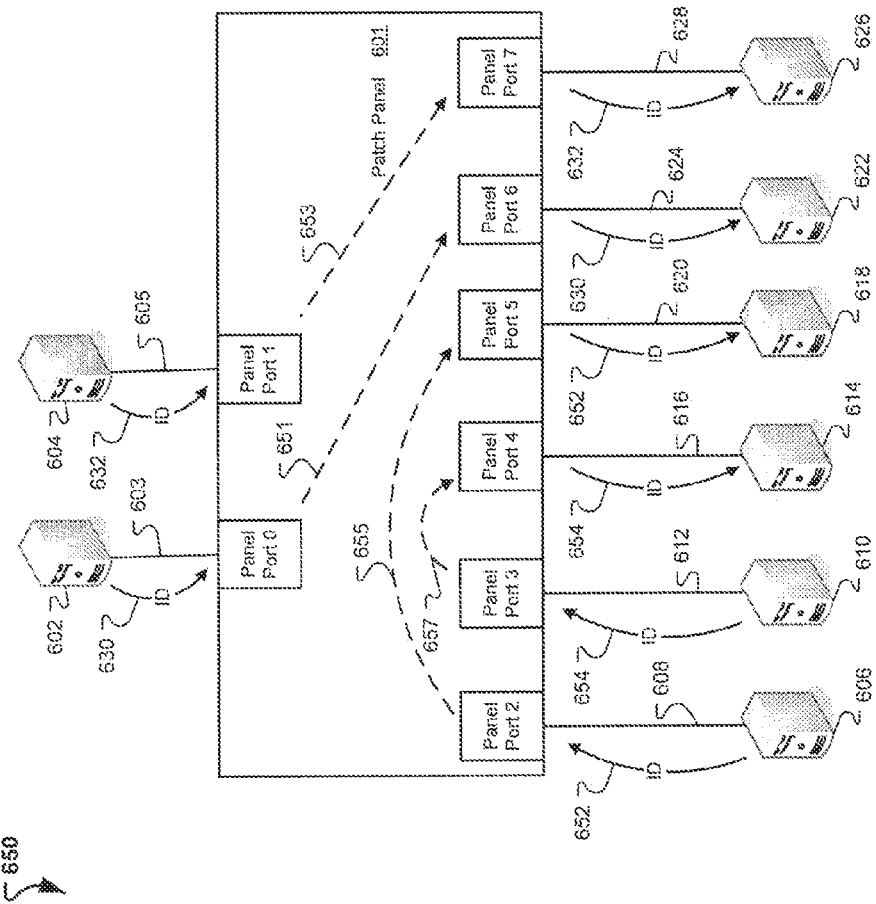

FIGS. 6A and 6B are block diagrams that illustrate example test rounds of an example connectivity test. A simple example patch panel device 601 includes eight patch panel communication ports, respectively numbered 0-7.

Patch panel port 0 is connected to an interface port of a first device 602 by communication link 603. Patch panel port 1 is connected to an interface port of a second device 604 by communication link 605. Patch panel port 2 is connected to an interface port of a third device 606 by communication link 608. Patch panel port 3 is connected to an interface port of a fourth device 610 by communication link 612. Patch panel port 4 is connected to an interface port of a fifth device 614 by communication link 616. Patch panel port 5 is connected to an interface port of a sixth second device 618 by communication link 620. Patch panel port 6 is connected to an interface port of a seventh device 622 by communication link 624. Patch panel port 7 is connected to an interface port of an eighth device 626 by communication link 628. The devices shown in FIGS. 6A and 6B are depicted servers, but in other implementations one or more of the devices may be switches, and one or more of the devices may include more than one interface port and may be physically connected to more than one patch panel port.

With reference to FIG. 6A, an example first test round 600 is illustrated. Initially, assume that patch panel port 0 and patch panel port 1 each have known connectivity status. For example, assume that it is known and verified that patch panel port 0 is physically coupled via communication link 603 to device 602, and that is known and verified that patch panel port 1 is physically coupled via communication link 605 to device 604. In examples where devices include more than one interface ports, known connectivity information would include knowledge of the particular port to which the patch panel port is connected. Assume also that connectivity information for each of patch panel ports 2, 3, 4, 5, 6, and 7 is initially unknown.

The patch panel device 601 can be configured to connect each of the patch panel ports for which connectivity information is known with a patch panel port for which connectivity is unknown. For example, the patch panel device 601 can be configured to connect patch panel port 0, for which connectivity information is known, to patch panel port 2, for which connectivity information is unknown. Also, the patch panel device 601 can be configured to connect patch panel port 1, for which connectivity information is known, to patch panel port 3, for which connectivity information is unknown. The patch panel device 601 may establish a connection 607 (e.g., a soft connection as discussed above) between patch panel port 0 and patch panel port 2 through the patch panel device 601, and may establish a connection 609 (e.g., a soft connection) between patch panel port 1 and patch panel port 3 through the patch panel device 601, for example. In some implementations, computing device 112 may send one or more messages to patch panel device 601 that includes configuration instructions for the ports of the patch panel, or instructions for establishing a connection between ports of the patch panel device.

With the connections 607 and 609 thus established, device 602, which may be associated with known patch panel port 0, may be caused to transmit a message 630. In some implementations, computing device 112 may instruct device 602 to send the message 630. In some implementations, the message 630 may include an identifier that identifies device 602, the known patch panel port 0, or both device 602 and patch panel port 0. Similarly, device 604, which may be associated with known patch panel port 1, may be caused to transmit a message 632. In some implementations, computing device 112 instruct device 604 to send the message 632, and message 632 may include an identifier that identifies device 604, known patch panel port 1, or both device 604 and patch panel port 1.

Message 630 will travel over physical communication link 603 and arrive at the patch panel device 601 at patch panel port 0. The message 630 will then be passed over connection 607 to patch panel port 2, and from patch panel port 2 will be transmitted to device 606 over physical communication link 608. Similarly, message 632 will travel over physical communication link 605 and arrive at the patch panel device 601 at patch panel port 1. The message 632 will then be passed over connection 609 to patch panel port 3, and from patch panel port 3 will be transmitted to device 610 over physical communication link 612. Device 606 will receive message 630, and device 610 will receive message 632.

In some implementations, devices 606 and 610, upon receiving, respectively, messages 630 and 632, may send a message that includes connectivity information to computing device 112. For example, computing device 606 may send a message that includes the identifier included in received message 630, and includes an indication of device 606. Computing device 112 may receive the message from device 606, and may determine that device 606 is associated with patch panel port 2. In particular, computing device 112 may determine that device 606 is physically connected to patch panel port 2 by a physical communication link (link 608 in this example), based on the indication that device 606 received message 630, that device 602, which originally sent message 630, is known to be physically coupled to patch panel port 0, and based on connection 607 that connects patch panel port 0 with patch panel port 2. Similarly, computing device 112 may receive the message from device 610, and may determine that device 610 is associated with (e.g., coupled to) patch panel port 3, based on device 610 receiving message 632, device 604 known to be coupled to patch panel port 1, and connection 609 connecting patch panel ports 1 and 3.

Computing device 112 may update the set of patch panel ports for which connectivity is known. For example, because connectivity information for patch panel ports 2 and 3 was determined during the test round, the set of patch panel ports for which connectivity is known after the first test round includes patch panel ports 0-3. Connectivity information for patch panel ports 4-7 remains unknown following the first test round.

With reference to FIG. 6B, an example second test round 650 is illustrated. As described above, patch panel port 0-3 each have known connectivity status at the beginning of the second test round, while patch panel ports 4-7 have unknown connectivity status. The patch panel device 601 can be configured to connect each of the patch panel ports for which connectivity information is known with a patch panel port for which connectivity is unknown. For example, the patch panel device 601 can be configured to establish the following connections between patch panel ports: patch panel port 0 to patch panel port 6 via a soft connection 651; patch panel port 1 to patch panel port 7 via a soft connection 653; patch panel port 2 to patch panel port 5 via a soft connection 655; and patch panel port 3 to patch panel port 4 via a soft connection 657. In some implementations, computing device 112 may send one or more messages to patch panel device 601 that includes configuration instructions for the ports of the patch panel, or instructions for establishing a connection between ports of the patch panel device.

With the connections 651, 653, 655, and 657 thus established, device 602 may be caused to transmit a message 630, device 604 may be caused to transmit a message 632, device 606 may be caused to transmit a message 652, and device 610 may be caused to transmit a message 654. In some implementations, computing device 112 may instruct devices 602, 604, 606, and 610 to respectively send the messages 630, 632, 652, and 654. In some implementations, message 630 may include an identifier that identifies device 602, the known patch panel port 0, or both device 602 and patch panel port 0. Message 632 may include an identifier that identifies device 604, known patch panel port 1, or both device 604 and patch panel port 1. Message 652 may include an identifier that identifies device 606, known patch panel port 2, or both device 606 and patch panel port 2. Message 654 may include an identifier that identifies device 610, known patch panel port 3, or both device 610 and patch panel port 3.

Message 630 will travel over physical communication link 603, arrive at patch panel port 0, be passed over connection 651 to patch panel port 6, and be transmitted to device 622 over physical communication link 624. Similarly, message 632 will travel over physical communication link 605, arrive at patch panel port 1, be passed over connection 653 to patch panel port 7, and be transmitted to device 626 over physical communication link 628. Message 652 will travel over physical communication link 608, arrive at patch panel port 2, be passed over connection 655 to patch panel port 5, and be transmitted to device 618 over physical communication link 620. Message 654 will travel over physical communication link 612, arrive at patch panel port 3, be passed over connection 657 to patch panel port 4, and be transmitted to device 614 over physical communication link 616. Device 622 will receive message 630; device 626 will receive message 632; device 618 will receive message 652; and device 614 will receive message 654.

In some implementations, devices 614, 618, 622, and 626, upon receiving, respectively, messages 654, 652, 630 and 632, may send a message that includes connectivity information to computing device 112. For example, computing device 614 may send a message that includes the identifier included in received message 654, and includes an indication of device 614. Computing device 112 may receive the message from device 614, and may determine that device 614 is associated with patch panel port 4. In particular, computing device 112 may determine that device 614 is physically connected to patch panel port 4 by a physical communication link (link 616 in this example), based on the indication that device 614 received message 654, that device 610, which originally sent message 654, is known to be physically coupled to patch panel port 3, and based on connection 657 that connects patch panel port 3 with patch panel port 4. Similarly, computing device 112 may receive the message from device 618, and may determine that device 618 is associated with (e.g., coupled to) patch panel port 5, based on device 618 receiving message 652, device 606 known to be coupled to patch panel port 2, and connection 655 connecting patch panel ports 2 and 5. Computing device 112 may receive the message from device 622, and may determine that device 622 is associated with (e.g., coupled to) patch panel port 6, based on device 622 receiving message 630, device 602 known to be coupled to patch panel port 0, and connection 651 connecting patch panel ports 0 and 6. Computing device 112 may receive the message from device 626, and may determine that device 626 is associated with (e.g., coupled to) patch panel port 7, based on device 626 receiving message 632, device 604 known to be coupled to patch panel port 1, and connection 653 connecting patch panel ports 1 and 7.

Computing device 112 may update the set of patch panel ports for which connectivity is known. For example, because connectivity information for patch panel ports 4-7 was determined during the test round, the set of patch panel ports for which connectivity is known after the second test round includes patch panel ports 0-7. As such, each of the patch panel ports 0-7 has known connectivity status after the second test round.

For the described golden connectivity test, the number of patch panel ports for which connectivity information is known is doubled at each round of testing. In the example of FIGS. 6A and 6B, connectivity for two patch panel ports of an 8-port device was initially known. After the first test round, connectivity information for four patch panel ports was known, and after the second test round connectivity information for all eight patch panel ports was known. Complete connectivity information that fully specifies the connectivity topology can thus be determined in $\{\text{ceiling}[\log_2 (n)] - \text{ceiling}[\log_2 (g)]\}$ test rounds, for a system with n patch panel ports with g known and verified ports. If g is of order n, the testing can be completed in a constant number of test rounds.

Figure 7:
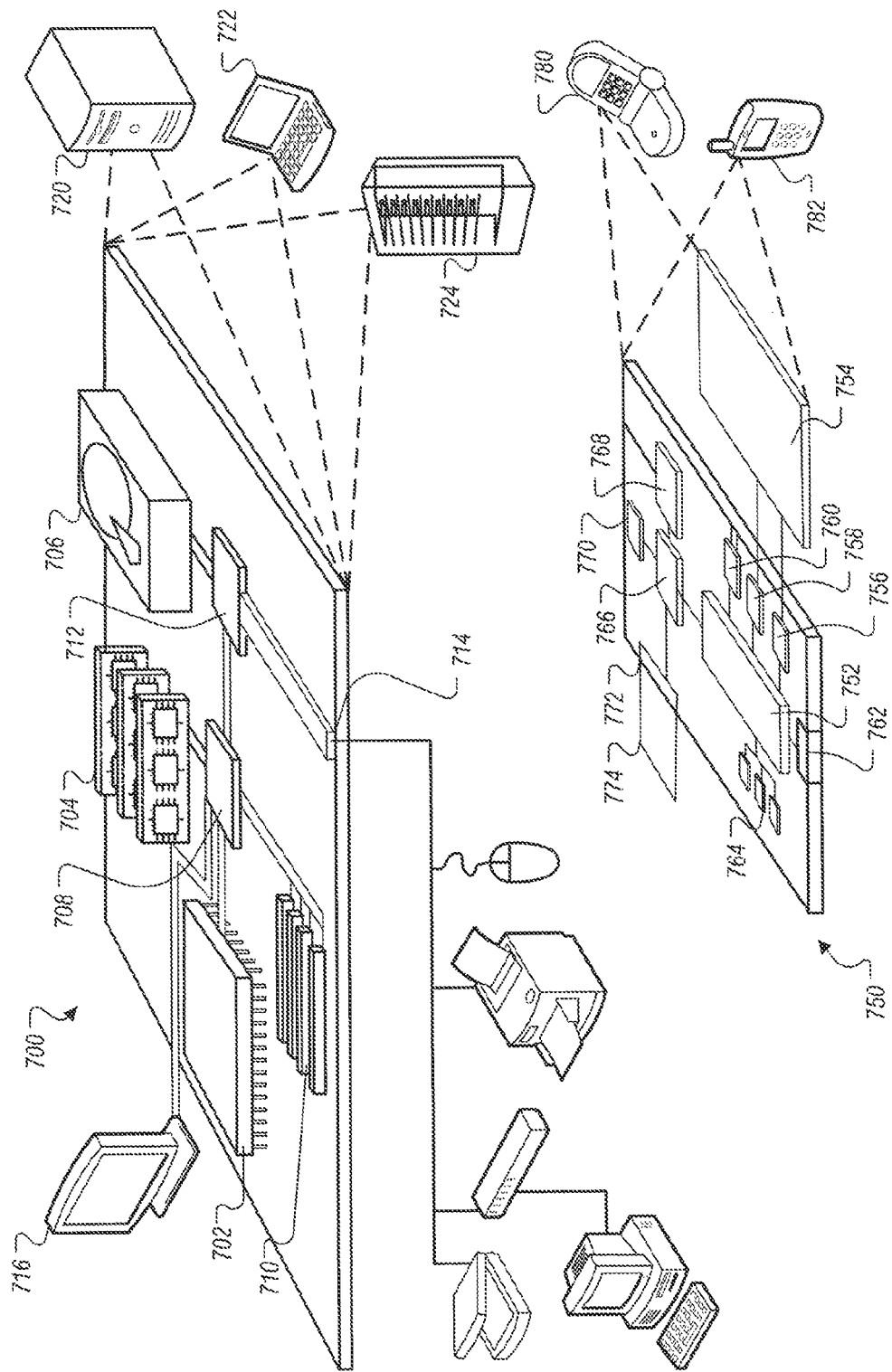
FIG. 7 is a block diagram of an example of a generic computer device and a generic mobile computer device that may be used to implement the systems and methods described in this document.

FIG. 7 shows an example of a generic computer device 700 and a generic mobile computer device 750 that may be used to implement the systems and methods described in this document. Devices 112, 240, 242, or 244, shown in FIG. 2, for example, may be implemented with one or more of the generic computer device 700 or the generic mobile computer device 750, according to some implementations. Also, processor boards 104 (e.g., switches or servers) may be implemented with portions of the generic computer device 700, according to some implementations.

Computing device 700 is intended to represent various forms of digital computers, such as laptops, desktops, workstations, servers, blade servers, mainframes, and other appropriate computers. Computing device 750 is intended to represent various forms of mobile devices, such as personal digital assistants, cellular telephones, smartphones, tablet computing devices, and other similar computing devices. The components shown here, their connections and relationships, and their functions, are meant to be exemplary only, and are not meant to limit implementations of the systems, methods, devices or techniques described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712 are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, a tape device, a flash memory or other similar solid-state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower-bandwidth-intensive operations. Such allocation of duties is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by the device 750.

Processor 752 may communicate with a user through control interface 758 and display interface 756 coupled to the display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near-area communication of device 750 with other devices. External interface 762 may provide, for example, for wired communication (e.g., via a docking procedure) or for wireless communication (e.g., via Bluetooth or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750. Specifically, expansion memory 774 may include instructions to carry out or supplement the processes described above, and may also include secure information. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal.

In some implementations, device 750 may communicate wirelessly through communication interface 766, which may include digital signal processing circuitry as appropriate. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS receiver module 770 may provide additional wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages or music files) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, tablet computing device, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

A number of embodiments have been described. Nevertheless, it will be understood that various modifications may be made. For example, the algorithms described can be implemented at a central controller device, such as device 112, or portions of the algorithms can be implemented at one or more of the servers or switches in the computing environment. The servers or switches may themselves keep track of their connectivity numbers during the testing rounds, and may report to a central controller at the conclusion of the testing. Although several applications of the systems and methods have been described, it should be recognized that numerous other applications are contemplated. Accordingly, other embodiments are within the scope of the following claims.

What is claimed is:

1. A method of determining physical connectivity between devices, comprising:
  performing, on a patch panel, a plurality of testing rounds equal to a minimum number of binary positions required in a binary representation that corresponds to a number of communication ports being tested, wherein each of the testing rounds corresponds to a particular position in the binary representation and comprises:

configuring the patch panel to send a message to a first sending device in response to receiving data at a patch panel communication port associated with a binary number representation having a first value at a position that corresponds to the position for the particular testing round, the received data having been sent by the first sending device;

configuring the patch panel to not send a message to a second sending device in response to receiving data at a patch panel communication port associated with a binary number representation having a second value, different from the first value, at the position that corresponds to the position for the particular testing round, the received data having been sent by the second sending device;

causing each device of the plurality of computing devices to transmit data over the corresponding physical communication link for arrival at a corresponding communication port of the patch panel; and receiving an indication, for each device of the plurality of computing devices, of whether or not the respective device received a message following the transmission of the data; and generating a connectivity map according to the received indications.

2. The method of claim 1, wherein the plurality of computing devices includes at least one server and at least one switch.

3. The method of claim 1, wherein the message that is transmitted to the first sending device comprises the data received on the corresponding patch panel communication port from the first sending device.

4. The method of claim 1, wherein the physical communication link comprises a fiber optic cable.

5. The method of claim 1, wherein the physical communication link comprises a copper wire.

6. The method of claim 1, wherein generating the connectivity map comprises, for each computing device of the plurality of computing devices, determining the patch panel communication port to which a corresponding device is physically coupled by generating a binary number that matches the unique binary number associated with the respective patch panel communication port.

7. The method of claim 6, wherein generating the binary number comprises providing a binary digit of the first value if a message is received at the computing device within a predetermined time from the transmission of the data.

8. The method of claim 6, wherein generating the binary number comprises providing a binary digit of the second value if a message is not received at the computing device within a predetermined time from the transmission of the data.

9. The method of claim 1, wherein the first value is "1" and the second value is "0".

10. The method of claim 1, wherein the first value is "0" and the second value is "1".

11. The method of claim 1, wherein the message is received by the respective device of the plurality of computing devices.

12. The method of claim 1, wherein computing devices of the plurality of computing devices that include more than one communication port transmit data from each of their more than one communication ports.

13. The method of claim 12, wherein an indication of whether or not a message is received following the transmission of the data is recorded for each of the more than one communication ports.

14. A non-transitory computer-readable storage device storing instructions that, when executed by one or more processing devices, perform operations comprising:

performing, on a patch panel, a plurality of testing rounds equal to a minimum number of binary positions required in a binary representation that corresponds to a number of communication ports being tested, wherein each of the testing rounds corresponds to a particular position in the binary representation and comprises:

configuring the patch panel to send a message to a first sending device in response to receiving data at a patch panel communication port associated with a binary number representation having a first value at a position that corresponds to the position for the particular testing round, the received data having been sent by the first sending device;

configuring the patch panel to not send a message to a second sending device in response to receiving data at a patch panel communication port associated with a binary number representation having a second value, different from the first value, at the position that corresponds to the position for the particular testing round, the received data having been sent by the second sending device;

causing each device of the plurality of computing devices to transmit data over the corresponding physical communication link for arrival at a corresponding communication port of the patch panel; and receiving an indication, for each device of the plurality of computing devices, of whether or not the respective device received a message following the transmission of the data; and generating a connectivity map according to the received indications.

15. A method of determining physical connectivity between devices, comprising:

performing, on a patch panel, a plurality of testing rounds, wherein the number of testing rounds is equal to the minimum number of bits needed to represent a number of communication ports of the patch panel, wherein each of the testing rounds comprises:

configuring the patch panel to establish, for patch panel communication ports known to be coupled to particular computing devices, a communication channel between the respective patch panel communication port and a patch panel communication port not known to be coupled to any of the plurality of computing devices, wherein a first number of the patch panel communication ports are initially known to be coupled to particular computing devices of the plurality of computing devices;

causing the particular computing devices to transmit data over the corresponding physical communication link; and receiving an indication of computing devices that received a message following the transmission of the data; and generating a connectivity map according to the received indication.

16. The method of claim 15, wherein the testing rounds are performed iteratively until all patch panel communication ports of the predetermined number of patch panel communication ports are known to be coupled to particular computing device of the plurality of computing devices.

17. The method of claim 15, wherein generating the connectivity map comprises, for each computing device of the plurality of computing devices that received a message following the transmission of the data, determining the patch panel communication port to which a corresponding device is physically coupled based on the received message and the communication channels established by the patch panel.

18. A non-transitory computer-readable storage device storing instructions that, when executed by one or more processing devices, perform operations comprising:

performing, on a patch panel, a plurality of testing rounds, wherein the number of testing rounds is equal to the minimum number of bits needed to represent a number of communication ports of the patch panel, wherein each of the testing rounds comprises:

configuring the patch panel to establish, for patch panel communication ports known to be coupled to particular computing devices, a communication channel between the respective patch panel communication port and a patch panel communication port not known to be coupled to any of the plurality of computing devices, wherein a first number of the patch panel communication ports are initially known to be coupled to particular computing devices of the plurality of computing devices;

causing the particular computing devices to transmit data over the corresponding physical communication link; and receiving an indication of computing devices that received a message following the transmission of the data; and generating a connectivity map according to the received indication.

19. The non-transitory computer-readable storage device of claim 18, wherein the testing rounds are performed iteratively until all patch panel communication ports of the predetermined number of patch panel communication ports are known to be coupled to particular computing device of the plurality of computing devices.

20. The non-transitory computer-readable storage device of claim 18, wherein generating the connectivity map comprises, for each device of the plurality of computing devices that received a message following the transmission of the data, determining the patch panel communication port to which the corresponding device is physically coupled based on the received message and the communication channels established by the patch panel.

* * * * *